United States Patent
Mori et al.

(10) Patent No.: US 8,409,714 B2
(45) Date of Patent: Apr. 2, 2013

(54) PRIMER COMPOSITION FOR OPTICAL ARTICLES AND OPTICAL ARTICLES

(75) Inventors: Katsuhiro Mori, Tsukuba (JP); Toshimitsu Hiraren, Tsukuba (JP)

(73) Assignee: Tokuyama Corporation (JP)

( * ) Notice: Subject to any disclaimer, the term of this patent is extended or adjusted under 35 U.S.C. 154(b) by 0 days.

(21) Appl. No.: 13/260,600

(22) PCT Filed: Mar. 25, 2010

(86) PCT No.: PCT/JP2010/055180
§ 371 (c)(1),
(2), (4) Date: Sep. 27, 2011

(87) PCT Pub. No.: WO2010/119755
PCT Pub. Date: Oct. 21, 2010

(65) Prior Publication Data
US 2012/0019888 A1      Jan. 26, 2012

(30) Foreign Application Priority Data

Apr. 16, 2009 (JP) ................... 2009-099644
Aug. 21, 2009 (JP) ................... 2009-191587

(51) Int. Cl.
*B32B 27/36* (2006.01)
*G02F 1/03* (2006.01)

(52) U.S. Cl. ..... 428/412; 428/212; 428/339; 428/423.1; 428/425.5; 359/241; 359/642; 524/364; 524/376

(58) Field of Classification Search ................ 428/212, 428/339, 412, 423.1, 425.5; 359/241, 244, 359/642; 524/364, 376
See application file for complete search history.

(56) References Cited

U.S. PATENT DOCUMENTS

| | | | |
|---|---|---|---|
| 4,882,438 A | 11/1989 | Tanaka et al. | |
| 4,913,544 A | 4/1990 | Rickwood et al. | |
| 4,960,678 A | 10/1990 | Tanaka et al. | |
| 5,623,005 A | 4/1997 | Rickwood et al. | |
| 6,680,125 B1 | 1/2004 | Sasaki | |
| 6,723,859 B2 | 4/2004 | Kawabata et al. | |
| 8,012,588 B2 | 9/2011 | Izumi et al. | |

(Continued)

FOREIGN PATENT DOCUMENTS

| | | |
|---|---|---|
| JP | 62-288830 | 12/1987 |
| JP | 63-141001 A | 6/1988 |

(Continued)

OTHER PUBLICATIONS

International Search Report dated May 25, 2010, issued in corresponding international application No. PCT/JP2010/051180.

*Primary Examiner* — Evelyn A. Lester
(74) *Attorney, Agent, or Firm* — Ostrolenk Faber LLP

(57) ABSTRACT

A primer coating composition is provided for an optical article capable of forming a coating layer having excellent impact resistance, abrasion resistance, and adhesion to various kinds of plastic materials without occurring of appearance faulty for an optical base material, for example, a plastic lens for an eyeglass. A primer composition for an optical article comprises; (A) aqueous dispersion of urethane resin having a polycarbonate-derived skeleton and the elongation of 200~1000%; (B) an organic solvent having 3~9 carbon atoms and having an ether bond or carbonyl bond and one hydroxyl group in a molecule; and (C) lower alcohol having 1~4 carbon atoms, wherein the weight ratio of said organic solvent to said lower alcohol is from 0.01 to less than 2.00.

17 Claims, 1 Drawing Sheet

U.S. PATENT DOCUMENTS

| | | |
|---|---|---|
| 2002/0159160 A1 | 10/2002 | Kayanoki |
| 2007/0245929 A1* | 10/2007 | Asami et al. ............. 106/287.18 |
| 2008/0022898 A1* | 1/2008 | Sudo et al. ............... 106/287.25 |
| 2009/0136746 A1 | 5/2009 | Murai et al. |
| 2009/0239048 A1 | 9/2009 | Sugihara et al. |
| 2009/0324956 A1 | 12/2009 | Otani et al. |

FOREIGN PATENT DOCUMENTS

| | | |
|---|---|---|
| JP | 2-28154 | 1/1990 |
| JP | 2896546 | 3/1994 |
| JP | 2956887 | 2/1996 |
| JP | 3269630 | 1/2002 |
| JP | 2009-258597 A | 11/2009 |
| WO | WO 94/17116 | 8/1994 |
| WO | WO 94/22850 | 10/1994 |
| WO | WO 96/14596 | 5/1996 |
| WO | WO 99/57212 A1 | 11/1999 |
| WO | WO 01/60811 | 8/2001 |
| WO | WO 02/02676 A1 | 1/2002 |
| WO | WO 2004/078476 | 2/2004 |
| WO | WO 2007/026529 A1 | 3/2007 |
| WO | WO 2008/001875 A1 | 1/2008 |

* cited by examiner optical base material → optical article → laminate photochromic optical base material → optical article → laminate optical article → first laminated article → second laminated article → third laminated article

PRIMER COMPOSITION FOR OPTICAL ARTICLES AND OPTICAL ARTICLES

CROSS-REFERENCE TO RELATED APPLICATIONS

The present application is a 35 U.S.C. §371 National Phase conversion of International Application No. PCT/JP2010/055180, filed Mar. 25, 2010, which claims benefit of Japanese Patent Application Nos. 2009-099644, filed Apr. 16, 2009 and 2009-191587, filed Aug. 21, 2009, the disclosures of which are incorporated herein by reference. The PCT International Application was published in the Japanese language.

TECHNICAL FIELD

This invention relates to a novel primer composition for an optical article comprising a urethane resin having a polycarbonate-derived skeleton and to a novel optical article having a primer coating layer which is formed by curing said primer composition on an optical base material. Further, this invention relates to a novel optical article (laminate) comprising said primer coating layer and a hard coating layer which is obtained by curing a hard coating layer-forming coating composition comprising inorganic oxide fine particles and an organosilicon compound (hereinafter referred to as just "coating composition" as the case may be) on said primer coating layer. Further, this invention relates also to a novel optical article having the primer coating layer and a photochromic coating layer showing photochromic properties which is formed on said primer coating layer.

Since an intact plastic lens, that is, as surface-non-treated plastic lens is low in the abrasion resistance and easy to be scratched, a hard coating layer is usually formed on its surface. Further, an antireflection coating layer is laminated on the hard coating layer for inhibition of reflected light, which is formed by depositing an inorganic oxide on the hard coating layer. It has been known that when the hard coating layer is laminated, the impact resistance of a plastic lens is lowered. It has been also known that when the antireflection coating layer is laminated on the hard coating layer, the impact resistance of a plastic lens is lowered more increasingly to be easily cracked. It has been, therefore, studied that a primer coating layer is inserted between a plastic lens and a hard coating layer for the purpose of improving the impact resistance.

As the above-described primer composition for a plastic lens, a primer composition comprising a urethane resin has been usually known. Specifically, (i) a primer composition using only a urethane resin (Patent Literatures 1 and 2), (ii) that comprising a mixture of an urethane resin and inorganic oxide fine particles (Patent Literature 3), (iii) that comprising a mixture of a urethane resin, inorganic oxide fine particles and an organosilicon compound (Patent Literature 4), etc. have been known. These primer compositions are good in the adhesion to a specific plastic lens and can improve the impact resistance.

However, these primer compositions have problems that the adhesion is insufficient depending on the types of plastic materials constituting a plastic lens and that when a hard coating layer of high hardness is laminated on the surface of the primer coating layer formed of these primer composition in order to improve the abrasion resistance, the impact resistance is not sufficiently improved.

For example, when a primer composition disclosed in Patent Literature 1 is used, the adhesion is often insufficient, depending on the types of plastic materials. Therefore, there is still room for improvement in this respect. Further, there have been problems that since the primer coating layer is cured at high temperatures, a plastic lens (optical base material) of low heat-resistance may be sometimes thermally deformed or colored. And furthermore, since an organic solvent such as toluene, etc. is used, there is still room for improvement in dissolution of a plastic lens or generation of odor in a work environment.

Primer compositions described in Patent Literatures 2, 3 and 4 use water as a main dispersing medium. However, these primer compositions have been room for improvement in the respects described below:

For example, when a primer composition disclosed in Patent Literature 2 is used, the adhesion is often insufficient, depending on the types of materials of a plastic lens. Therefore, there is still room for improvement in this respect. Further, when a hard coating layer of high hardness is laminated, the impact resistance is not sufficiently improved. Therefore, there is also room for improvement in this respect.

Also, when a primer composition comprising a mixture of urethane resin (aqueous dispersion) with inorganic oxide fine particles disclosed in Patent Literature 3 is used, the adhesion is often insufficient, depending on the types of plastic lens (optical base material). There is no problem for an optical article obtained by the use of such a primer composition as disclosed in Patent Literature 3 by direct visual observation. However, when the smoothness of the coating is observed by a shadow formed by projecting light, a fault in appearance is often observed, which may be possibly caused by blending proportion of dilute solvent used. Therefore, there is still room for improvement in this respect.

When a primer coating layer is laminated by making use of a primer composition comprising a mixture of urethane resin, inorganic oxide fine particles and an organosilicon compound disclosed in Patent Literature 4, high reflective index and sufficient adhesion can be obtained. In some cases, however, the impact resistance is not sufficiently improved or a fault in appearance occurs because of using water as dilute solvent. Therefore, there is still room for improvement in these respects.

In recent years, an aqueous dispersion of urethane resin has been used for a primer composition for improving the impact resistance of plastic lens from the view point of environmental problems. However, when an aqueous dispersion of urethane resin is used, there are many problems in low wettability to a plastic lens and appearance of the coating such as smoothness, etc. If, however, an organic solvent is added in order to improve the wettability and the smoothness of the coating, a new problem occurs sometimes in that the storage stability of primer composition itself lowers.

For an optical article, another application of a primer composition is to improve the adhesion of a photochromic coating layer and an optical base material (plastic lens). The photochromic coating layer is formed by coating the plastic lens with a photochromic coating agent comprising a photochromic compound and a polymerizable monomer and curing the coating agent (hereinafter, method for forming such a photochromic coating layer is referred to as "coating method" as the case may be).

In the coating method, a photochromic coating layer can be formed directly on the plastic lens (optical base material) by the use of a photochromic coating agent comprising a specific polymerizable monomer. In recent years, however, in order to improve more highly the adhesion of the photochromic coating layer and the plastic lens, a method has been adopted for forming a photochromic coating layer after forming a primer coating layer on a plastic lens. Specifically, in order to form the primer coating layer, a method has been known of using a primer composition comprising a moisture-curable polyurethane resin (Patent Literature 5) or a primer composition comprising urethane resin emulsion (Patent Literature 6). These methods can enhance the adhesion of the photochromic coating layer and the plastic lens. There is, however, still room for improvement in the respects described below:

For example, in the method described in Patent Literature 5, when a polycarbonate is used as a plastic material, the surface of the plastic lens is sometimes dissolved excessively. This may be possibly caused by the influence of solvent used. In order to prevent that, a different coating layer must be formed on the surface of the plastic lens. Therefore, there is still room for improvement in operability.

In the method described in Patent Literature 6, the adhesion of plastic lens and a photochromic coating layer can be sufficiently secured. However, the effect of improving the impact resistance of the plastic lens obtained is slight. This may be possibly caused by the structure of the urethane resin used. Therefore, the method described in Patent Literature 6 leaves room for improvement for use in the upgrading of the impact resistance.

As described above, in the primer composition used in the production of a photochromic plastic lens according to the coating method, the development of a primer composition applicable to a plastic lens of various types of materials has been expected. Further, the development of a primer composition has been expected which is capable of improving not only the impact resistance of a plastic lens, but also the adhesion of a plastic lens and a photochromic coating layer.

CITATION LIST

Patent Literature

PTL 1: Japanese Patent No. 2956887
PTL 2: Japanese Patent No. 3269630
PTL 3: International Publication WO 02/002676, pamphlet
PTL 4: Japanese Patent No. 2896546
PTL 5: International Publication WO 04/078476, pamphlet
PTL 6: International Publication WO 08/001,875, pamphlet

SUMMARY OF INVENTION

Problems to be Solved by Invention

Accordingly, a general object of this invention is to provide a primer composition for an optical article having excellent storage stability itself which not only improves the impact resistance of an optical base material (plastic lens), but also forms a film (coating layer) which has uniform smoothness, does not bring about fault in appearance, and is excellent in the adhesion with the optical base material.

A specific object of this invention is to provide a primer composition for an optical article which exhibits excellent abrasion resistance and impact resistance when a primer coating layer obtained by the primer composition is formed on the optical base material and then a hard coating layer formed by inorganic oxide fine particles and a hydrolyzate of an organosilicon compound is laminated thereon.

Still, a further specific object of this invention is to provide a primer composition for an optical article which can improve also the adhesion of a photochromic coating layer and an optical base material when a primer coating layer obtained by the primer composition is formed on the optical base material and then the photochromic coating layer comprising a photochromic compound is formed on the primer coating layer.

Means for Solving the Problems

We have studied devotedly in order to solve the above-described problems. As a result, we have found it is necessary to combine specific solvents and to use urethane resin having a specific structure (physical properties) in order that the appearance of an optical article obtained is improved more highly, and that performances such as the impact resistance, abrasion resistance, adhesion, etc. are superior to those of a prior art, and that the storage stability of the primer composition itself is also improved, and accomplished this invention.

Further, we have found that such a primer composition as combined described above can improve also the adhesion of an optical base material (plastic lens) and a photochromic coating layer comprising a photochromic compound and accomplished this invention.

A first object of this invention is to provide a primer composition for an optical article comprising;
(A) aqueous dispersion of urethane resin in which urethane resin having a polycarbonate-derived skeleton and the elongation of 200~1000% is dispersed in water;
(B) an organic solvent having 3~9 carbon atoms and having an ether bond or carbonyl bond in a molecule and one hydroxyl group in a molecule; and
(C) lower alcohol having 1~4 carbon atoms, wherein the weight ratio of said organic solvent (B) to said lower alcohol (C) (B/C) is from 0.01 to less than 2.00.

The above-described primer composition for an optical article may contain (D) a hydrolyzable group-containing organosilicon compound and preferably contains (E)-inorganic oxide fine particles.

A second object of this invention is to provide an optical article having on the optical base material a primer coating layer obtained by curing the above-mentioned primer composition for an optical article.

An excellent effect can be exhibited for the above-mentioned optical article in cases where the above-described optical base material is a photochromic optical base material, particularly where the photochromic optical base material has a photochromic coating layer obtained by curing a photochromic coating agent comprising a photochromic compound and a polymerizable monomer.

A third object of this invention is to provide a laminate having a hard coating layer obtained by curing a coating composition comprising inorganic oxide fine particles and a hydrolyzable group-containing organosilicon compound on the primer coating layer of the afore-mentioned optical article.

A fourth object of this invention is to provide a first laminated article having a photochromic coating layer obtained by curing a coating agent comprising a photochromic compound on the primer coating layer of the afore-mentioned optical article.

A fifth object of this invention is to provide a second laminated article having a primer coating layer formed of the primer composition of the first object of this invention on the photochromic coating layer of the above-described first laminated article.

A sixth object of this invention is to provide a third laminated article obtained by forming the afore-mentioned hard coating layer on the primer coating layer of the afore-mentioned second laminated article.

The primer composition of this invention can improve the adhesion of a photochromic coating layer to an optical base material, (especially a plastic lens).

Advantageous Effects of Invention

The primer composition for an optical article of this invention can improve the adhesion of an optical base material (specifically, plastic lens) to a hard coating layer. Further, the primer composition for an optical article of this invention can improve the impact resistance of an optical article having such a hard coating layer. Furthermore, the primer composition for an optical article of this invention has excellent storage stability.

An optical article having a primer coating layer obtained by curing the primer composition for an optical article of this invention has excellent impact resistance compared with a plastic lens on which only a hard coating layer is laminated and the adhesion of the hard coating layer is high. Further, by the use of the primer composition for an optical article of this invention, a plastic lens equipped with a hard coating layer of high quality having excellent abrasion resistance and appearance can be obtained.

The primer composition for an optical article of this invention can exhibit excellent effect in case where an optical base material is a photochromic optical base material. The primer composition for an optical article of this invention can exhibit special excellent effect, specifically when the photochromic optical base material is a plastic lens on which a photochromic coating layer is formed. In that case, at least a primer coating layer formed of the primer composition for an optical article of this invention is formed on the photochromic coating layer.

Further, the primer composition for an optical article of this invention can improve the adhesion of a plastic lens and a photochromic coating layer. When the primer composition for an optical article of this invention is used for such applications, a primer coating layer made of the primer composition for an optical article of this invention is formed on the plastic lens, and then the photochromic coating layer is formed on the primer coating layer.

As described above, the primer composition for an optical article of this invention can improve the adhesion of an optical base material and a hard coating layer, the adhesion of the optical base material and a photochromic coating layer, and the adhesion of the photochromic coating layer and the hard coating layer. Further, the primer composition for an optical article of this invention can improve the impact resistance of the optical article having such coating layers.

DESCRIPTION OF EMBODIMENTS

Figure 1:
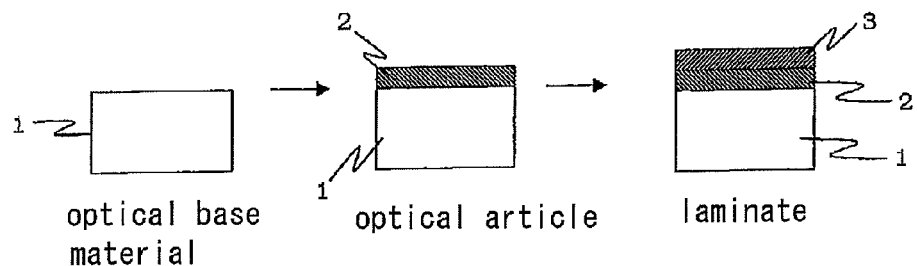
FIG. 1 is a flow diagram of a working embodiment for production of a laminate of this invention.

This invention is detailed below:
This invention is relating to a primer composition for an optical article characterized by comprising;
(A) aqueous dispersion of urethane resin in which urethane resin having a polycarbonate-derived skeleton and the elongation of 200~1000% is dispersed in water;
(B) an organic solvent having 3~9 carbon atoms and having an ether bond or carbonyl bond in a molecule and having one hydroxyl group in a molecule; and
(C) lower alcohol having 1~4 carbon atoms.

A primer composition for an optical article is applied to an optical base material such as a plastic lens and improves the impact resistance of the optical article obtained. A primer coating layer made of the primer composition for an optical article is formed between the optical base material and a hard coating layer or photochromic coating layer which are detailed below and can improves the adhesion of the both. Specifically, the primer composition for an optical article can improve the impact resistance of plastic lens having the hard coating layer (laminate or third laminated article).

Firstly, each of components of the primer composition for an optical article is described:

(A) Aqueous Dispersion of Urethane Resin

The primer composition for an optical article of this invention comprises (A) aqueous dispersion of urethane resin having a polycarbonate-derived skeleton and the elongation of 200~1000%. The aqueous dispersion of urethane resin is defined as an aqueous dispersion in which urethane resin satisfying such physical properties is dispersed (hereinafter "aqueous dispersion of urethane resin" is referred to just "(A)-component" as the case may be).

Since the urethane resin has a polycarbonate-derived skeleton, it comprises a reaction product of polycarbonate polyol with polyisocyanate. Generally, as polyol constituting urethane resin, polyalkylene glycol, polyester polyol, polyether polyol, polyether esterpolyol, etc. are used. However, taking the effect for improving the adhesion and impact resistance with respect to various types of optical base materials into consideration, it is important to use polycarbonate polyol. That is to say, according to this invention an excellent effect can be obtained by the use of urethane resin having polycarbonate-derived skeleton.

As the polycarbonate polyol, known polycarbonate polyols may be used without limitations, and poly (alkylene carbonate) such as poly (hexamethylene carbonate), etc. may be exemplified.

Illustrative examples of the afore-mentioned polyisocyanate include an aromatic isocyanate compound such as tolylenediisocyanate, 4,4-diphenylmethanediisocyanate, xylenediisocyanate, 1,5-naphthalenediisocyanate, toluidinediisocyanate, phenylenediisocyanate, 4,4-diphenyldiisocyanate, dianisidinediisocyanate, 4,4-diphenyletherdiisocyanate, triphenylmethanetriisocyanate, tris(isocyanatephenyl)thiophosphate, tetramethylxylenediisocyanate, etc.; and an aliphatic isocyanate compound such as 1,3,3-trimethylhexamethylenediisocyanate, 4,4'-, 2,4'-, or 2,2'-dicyclohexylmethanediisocyanate or mixture thereof, hexamethylenediisocyanate, isophronediisocyanate, hydrogenated xylenediisocyanate, lysinediisocyanate, lysineestertriisocyanate, 1,6,11-undecanetriisocyanate, 1,8-diisocyanate-4-isocyanatemethyloctane, 1,3,6-hexamethylenetriisocyanate, bicycloheptanetriisocyanate, etc.

The urethane resin used in this invention is composed of the afore-mentioned polycarbonate polyol and the afore-mentioned polyisocyanate, but may contain polyisocyanate having one or more sulfur or halogen atoms, and denaturants such as biuret, isocyanurate, allophanate, carbodiimide, etc.

Further, as the urethane resin used in this invention, it is preferable to use the urethane resin having a crosslinking structure. By the use of the urethane resin having a crosslinking structure in a molecule, when a coating composition for forming a hard coating layer is applied to a primer coating layer, it is possible to enhance the dissolution resistance of the primer coating layer against the coating composition to shorten the production time for a laminate. And, a laminate thus obtained is excellent in appearance and impact resistance.

In this invention, a urethane resin having the elongation of 200~1000% may be used as the above-described urethane resin. When the elongation is less than 200%, the impact resistance of an optical article having the primer coating layer formed thereon is insufficient; the reason for this may be possibly that the flexibility of the primer coating layer obtained is lowered. When the elongation is more than 1000%, the properties of an optical article obtained are disadvantageously deteriorated; the reason for this may be possibly that the primer coating layer becomes soft excessively. Specifically, when a hard coating layer obtained by curing a coating composition comprising inorganic oxide fine particles and an organosilicon compound is formed on the primer coating layer, the abrasion resistance of the hard coating layer is lowered and simultaneously the impact resistance of the laminate obtained (an optical article having a hard coating layer) is lowered. Therefore, such a case where the elongation is more than 1000% is not preferable.

A case where the elongation of urethane resin does not satisfy the above-described range in the use of the improvement of the adhesion of a photochromic coating layer and an optical base material (the uses of a first, second and third laminated articles) is not preferable because the adhesion cannot be improved sufficiently.

Accordingly, taking the performances of the optical article, laminate, first laminated article obtained into consideration, the elongation of urethane resin is preferably from 250 to 900%.

In this invention, the elongation of urethane resin was measured in such a manner as described below: Firstly, aqueous dispersion comprising urethane resin is put into a container such as a chalet so that the film thickness of the urethane resin after drying becomes about 500 μm, dried at a room temperature for 24 hours, dried at a temperature of 80° C. for 6 hours, and then dried at a temperature of 120° C. for 20 minutes to prepare a film of urethane resin. Thereafter, the film of urethane resin is cut off in size 15 mm (width)×200 mm (length), and then a test piece is prepared in the mid section of which marks are produced at equal intervals of 50 mm. Such a test piece thus prepared is attached to a tensile testing machine, and then the elongation is measured by pulling the test piece at a speed of 200 mm/minutes with a distance between grips of 100 mm to be fractured. The measuring temperature is 23° C. The elongation is calculated in such a manner as described below:

Elongation(%)=((distance between marks at the time of fracture−distance between marks before the test)/(distance between marks before the test))× 100

It is preferable that the urethane resin has the elongation of 200~1000% measured in such a manner as described above and simultaneously 100% modulus of 1.5 to 18 N/mm². The 100% modulus is a value measured simultaneously with the above-described elongation and means the stress when the length of the afore-mentioned film of urethane resin (test piece) is 2 (two) times (elongation of 100%) the length before the test (distance between grips before the test). Since the 100% modulus of urethane resin satisfies the above-described range, the performances of an optical article, laminate, first laminated article, etc. obtained can be improved.

While the urethane resin used in this invention is not specifically limited so long as its elongation satisfies the above-described range, its glass transition point (Tg) is preferably less than 0° C., more preferably −5° C. and below and most preferably −10° C. and below. By the use of the urethane resin having Tg of less than 0° C., the impact resistance and adhesion of an optical article, laminate, first laminated article, etc. can be more improved. While the lowest limit of Tg of the urethane resin is not particularly limited, it is preferably −100° C. and above, more preferably −70° C. and above, and most preferably −50° C. and above, taking the productivity of urethane resin and performances of an optical article, laminate, first laminated article, etc. obtained into consideration.

The above-described Tg of the urethane resin is a value measured in such a manner as described below: The similar test piece to the film of urethane resin used for measurement of its elongation was used as a test piece for measurement of Tg. By the use of such a test piece, Tg was measured by means of "DMS 5600" (trade name for a dynamic viscoelasticity measuring device manufactured by SII Co., Ltd.). The measurement was carried out under conditions, that is, deformation mode; tension, speed of rise of temperature; 5° C./minutes, measuring frequency; 10 Hz, range of measuring temperature; −100° C. to 200° C.

In this invention, aqueous dispersion of urethane resin satisfying the above-described elongation (urethane resin dispersed in water) is used. The average particle diameter of the urethane resin in the aqueous dispersion is preferably from more than 50 nm to 140 nm or below. When the average particle diameter is more than 140 nm, the storage stability of the primer composition itself tends to lower, when lower alcohol is added for the purpose of the improvement of wettability to a plastic lens (optical article) as detailed below. We speculate that this is because that since urethane resin is easy to swell in lower alcohol, viscosity increases as the amount of addition of lower alcohol increases; which makes the primer composition for a optical article of this invention unstable. On the other hand, when the average particle diameter of the urethane resin in the aqueous dispersion is 50 nm or below, it is hard to prepare aqueous dispersion of urethane resin itself. It is speculated that since the average particle diameter of urethane resin in aqueous dispersion satisfies the above-described range, a uniform film (primer coating layer) having excellent smoothness can be formed and consequently an optical article having excellent appearance can be obtained, when it is combined with an organic solvent as detailed below. It is, further, considered that since the urethane resin satisfies the above-described range of average particle diameter, the storage stability can be improved.

The average particle diameter of urethane resin in the aqueous dispersion is a value measured by a laser diffraction scattering particle size distribution measuring device "LS230" (trade name for Beckman Coulter Co. Ltd.). In this invention, the particle diameter of the urethane resin was measured by means of optical diffraction method using laser having wavelength of 750 nm and such a measuring device. The average particle diameter in this invention is a volume average value measured by such a method.

In this invention, the concentration of the urethane resin in aqueous dispersion (the concentration of the solid content of the urethane resin) may be determined properly depending on different types of requirements, for example objective for use and may be preferably from 3 to 60 wt %. To the aqueous dispersion of urethane resin used in this invention, an organic solvent, other than water, having high boiling point such as N-methylpyrrolidone, etc. may be added in preferably 10 wt % and below, more preferably 7 wt % and below for the purpose of improving the stability or film-forming properties of urethane resin.

As the aqueous dispersion of urethane resin which satisfies the above-described requirements, commercially available ones may be used; specifically "SUPERFLEX" series (manufactured by Dai-ichi Kogyou Seiyaku Co. Ltd. and registered trade mark), "NEOSTECKER" series and "EVAFANOL" series (manufactured by NICA CHEMICAL Co., Ltd. and both are registered trade mark), "HYDRAN" series (manufactured by DIC Corporation and registered trade mark) are exemplified.

(B) An Organic Solvent Having 3 to 9 Carbon Atoms and Having an Ether Bond or Carbonyl Bond in a Molecule and One Hydroxyl Group in a Molecule:

The primer composition for an optical article of this invention uses (B) an organic solvent having 3 to 9 carbon atoms and having an ether bond or carbonyl bond in a molecule and one hydroxyl group in a molecule (hereinafter this component is referred to as just "(B)-component" as the case may be).

The above-described (B)-component exhibits effects of improving the wettability of the primer composition to a plastic lens (optical base material) and of controlling repellency.

Illustrative examples of preferred (B)-component are ethers such as ethylene glycol monomethylether, ethylene glycol monoisopropylether, ethylene glycol monoethylether, ethylene glycol mono-n-propylether, ethylene glycol mono-n-butylether, ethylene glycol mono-t-butylether, propyleneglycol monomethylether, propyleneglycol monoethylether, propyleneglycol mono-n-propylether, propyleneglycol mono-n-butylether, propyleneglycol monomethylether acetate, propyleneglycol monoethylether acetate, dioxane, etc.; ketones such as diacetone alcohol, etc. Above all, diacetone alcohol, ethyleneglycol monoisopropylether, ethyleneglycol monoethylether, ethyleneglycol mono-n-butylether, ethyleneglycol mono-t-butylether, propyleneglycol monomethylether and propyleneglycol monoethylether may be preferable. These may be used independently or in combination of two or more kinds.

Among the above-described organic solvents, an organic solvent having a boiling point of 110~200° C. may be preferable as the above-described (B)-component, taking the improvement in wettability and control of repellency into consideration.

(C) Lower Alcohol Having 1~4 Carbon Atoms

The primer composition for an optical article of this invention comprises lower alcohol having 1~4 carbon atoms (hereinafter referred to as just "(C)-component" as the case may be). It is considered that the (C)-component has effects of the improvements in the smoothness of the primer coating layer to be formed and the uniform of film thickness. Accordingly, the surface tension at a temperature of 20° C. of (C)-component may be 18~25 dyn/cm$^2$.

Illustrative examples of the (C)-component include methanol, ethanol, n-propanol, isopropanol, n-butanol, t-butanol, 2-butanol, etc. Among them, methanol, ethanol, isopropanol, t-butanol and 2-butanol may be preferable. Furthermore, such a solvent having relatively high boiling point as isopropanol, t-butanol, 2-butanol, etc. may be preferable from the view point of the control of the volatilization of solvent from the primer composition at the time of using and the stable use of the primer composition for long term. These may be used independently or in combination of two or more kinds.

When the primer composition for an optical article of this invention contains inorganic oxide fine particles as detailed below, methanol, ethanol or isopropanol may be possibly used as a dispersing medium for the inorganic oxide fine particles. In such cases, these dispersing media may be contained in (C)-component. Even when such inorganic oxide fine particles are used, it is preferable that (C)-component may contain methanol or t-butanol.

Weight Ratio of (B)-Component to (C)-Component (B)-component and (C)-component must be used in this invention so that the weight ratio of (B)-component to (C)-component (B/C) becomes from 0.01 to less than 2.00. The weight ratio (B/C) is a value obtained by dividing the weight of (B)-component by that of (C)-component. When the weight ratio (B/C) is less than 0.01, the wettability of the primer composition for an optical article to an optical base material, specifically plastic lens lowers to cause faults such as repellency and the storage stability of the primer composition itself lowers. It is not therefore preferable. When the weight ratio (B/C) is 2.00 and above, the smoothness of the primer coating layer formed and uniform of the film thickness cannot be sufficiently secured to cause fault in appearance. It is not therefore preferable. In order to improve the storage stability of the primer composition for an optical article itself, to improve the wettability, to lessen the faults such as repellency and to form a primer coating layer having excellent appearance, the weight ratio (B/C) is preferably from 0.05 to 1.50, more preferably from 0.20 to 1.00, and most preferably from 0.30 to 0.80.

The reason why this invention can lessen the weight ratio (B/C) compared with prior arts is not made clear. It is, however, considered that the reason is to use urethane resin having a polycarbonate skeleton. Further, when the aqueous dispersion of urethane resin having the above-described average particle diameter is used, the storage stability of the primer composition for an optical article has a tendency to be more improved, even though the weight ratio (B/C) is lessened, In order to obtain an optical article (laminate) having excellent appearance by the use of the primer composition for an optical article of this invention, it is preferable that the weight ratio of (B)-component to (C)-component satisfies the above-described range and it is specifically preferable to use (B)-component and (C)-component in combination described below: Specifically, it is preferable that (B)-component is diacetone alcohol, propyleneglycol monomethylether or propyleneglycol monoethylether and (C)-component is isopropanol, t-butanol, 2-butanol or methanol. Among them, a combination of diacetone alcohol as (B)-component with t-butanol, 2-butanol or methanol as (C)-component or a combination of propyleneglycol monomethylether as (B)-component with t-butanol, 2-butanol or methanol as (C)-component is particularly preferable.

In the calculation of the weight ratio (B/C), when (E)-inorganic oxide fine particles as detailed below are used in state where they are dispersed in (C)-component, the amount of such (C)-component must be taken into consideration. However, when (D)-hydrolyzable group-containing organosilicon compound as detailed below is used, the amount of (C)-component which is produced by hydrolysis of the hydrolyzable organosilicon compound is not taken into consideration. It is considered that the amount of such (C)-component as produced from the hydrolyzable organosilicon compound is small and does not significantly affect the primer composition for an optical article of this invention.

Blending Amount of Each of the Components

Blending Amount of Each of the (B)-Component and (C)-Component

As afore-mentioned, the primer composition for an optical article of this invention comprises; (A) aqueous dispersion of urethane resin, (B) an organic solvent having 3 to 9 carbon atoms and having an ether bond or carbonyl bond in a molecule and one hydroxyl group in a molecule, and (C) lower alcohol having 1~4 carbon atoms.

Taking the smoothness of the primer coating layer formed, uniform of the film thickness, impact resistance of an optical article and adhesion of hard coating layer or photochromic coating layer with an optical base material into consideration, blending ratios of each of these components are preferably those described below:

To 100 parts by weight of solid content of (A) aqueous dispersion of urethane resin (solid content obtained by concentrating (A)-component and drying: hereinafter referred to as just "solid content of urethane resin" as the case may be), (B)-component may be preferably from 10 to 600 parts by weight, and (C)-component may be preferably from 10 to 800 parts by weight (hereinafter, when the blending ratio of each of components to the solid content is described, it is described in the blending ratio to urethane resin, as the case may be). Among them, taking the workability and remarkability of the above-described effects into consideration, to 100 parts by weight of urethane resin, (B)-component may be preferably from 50 to 400 parts by weight, more preferably from 100 to 300 parts by weight, and particularly preferably from 120 to 250 parts by weight; and (C)-component may be preferably from 30 to 600 parts by weight, more preferably from 100 to 550 parts by weight, and particularly preferably from 120 to 530 parts by weight. While the amount of each of (B)-component and (C)-component is preferably within the above-described ranges, (B)-component and (C)-component must, of course, satisfy the range of the weight ratio (B/C) of from 0.01 to less than 2.00.

As for the amount of (C)-component, when (E)-inorganic oxide fine particles as detailed below are used in state where they are dispersed in (C)-component, the amount of such (C)-component must be contained in the amount of (C)-component. However, when (D)-hydrolyzable group-containing organosilicon compound as detailed below is used, the amount of such (C)-component which is produced by hydrolysis of the hydrolyzable organosilicon compound is not contained in the amount of (C)-component.

Blending Amount of Water:

Additional water other than water contained in (A)-component may be added in the primer composition for an optical article of this invention, if necessary. While the blending amount of water may be adjusted according to the use, it is preferably from 100 to 1500 parts by weight to 100 parts by weight of solid content of urethane resin.

For example, when the primer composition for an optical article is used for the purpose of forming a primer coating layer in case of laminating a hard coating layer, the storage stability of the primer composition for an optical article itself can be enhanced by blending water and further, a smooth primer coating layer can be formed. These effects are specifically usefulness. This is because that when the primer coating layer is formed by applying the primer composition by dipping, the primer composition must be stored in a dipping tank for ling-term. Therefore, when the primer composition for an optical article of this invention is used as a primer coating layer in case of laminating a hard coating layer, in the primer composition for an optical article of this invention, to 100 parts by weight of solid content of urethane resin, water may be preferably from 150 to 1500 parts by weight, more preferably from 300 to 1000 parts by weight, and particularly preferably from 500 to 1000 parts by weight; provided that such amount of water involves the amount of water contained in an aqueous dispersion of urethane resin.

On the other hand, when the primer composition for an optical article is used for the purpose of forming a primer coating layer in case of laminating a photochromic coating layer (that is, it is used for a first laminated article), in order to form a smooth primer coating layer having the given film thickness, the blending amount of water may be preferably; to 100 parts by weight of solid content of urethane resin, water is preferably from 100 to 1000 parts by weight, more preferably from 150 to 500 parts by weight, and particularly preferably from 150 to 300 parts by weight.

As for the above-described amount of water, in case where water is used when (D) hydrolyzable group-containing organosilicon compound and (E)-inorganic oxide fine particles which are detailed below are added in the primer composition for an optical article of this invention, the above-described amount of water involves the amount of such water.

The primer composition for an optical article of this invention can be prepared by mixing the above-described (A)-component, (B)-component and (C)-component and water, if necessary, by means of known methods. The order of mixing each of components is not specifically restricted.

While the primer composition for an optical article of this invention can exhibit excellent effects by containing the above-described (A)-component, (B)-component and (C)-component, (D)-hydrolyzable group-containing organosilicon compound or (E)-inorganic oxide fine particles may be added to the primer composition for an optical article of this invention in order to exhibit more excellent effects. These components are described below:

(D)-Hydrolyzable Group-Containing Organosilicon Compound

The primer composition for an optical article of this invention may contain (D)-hydrolyzable group-containing organosilicon compound (hereinafter this component is referred to as just "(D)-component" as the case may be). By blending (D)-component, the adhesion of the primer coating layer formed and an optical base material (plastic lens), the adhesion of the primer coating layer formed and a hard coating layer, and further the adhesion of the primer coating layer formed and a photochromic coating layer can be improved.

Illustrative examples of preferable (D)-component include γ-glycidoxypropyltrimethoxysilane, γ-glycidoxypropylmethyldimethoxysilane, γ-glycidoxypropylmethyldiethoxysilane, γ-glycidoxypropyltriethoxysilane, β-(3,4-epoxycyclohexyl)ethyltrimethoxysilane, tetraethoxysilane, vinyltrimethoxysilane, vinyltriethoxysilane, vinyltriacetoxysilane, methyltrimethoxysilane, methyltriethoxysilane, methyltriphenoxysilane, dimethyldimethoxysilane, trimethylmethoxysilane, phenyltrimethoxysilane, diphenyldimethoxysilane, cyclohexylmethyldimethoxysilane, n-propyltrimethoxysilane, n-butyltrimethoxysilane, isobutyltrimethoxysilane, isobutyltriethoxysilane, n-hexyltrimethoxysilane, n-hexyltriethoxysilane, n-octyltrietoxysilane, n-decyltrimethoxysilane, 1,6-bistrimethoxysilane, 3-ureidopropyltriethoxysilane, bis[3-(diethoxymethylsylyl)propyl]carbonate, trifluoropropyltrimethoxysilane, perfluorooctylethyltriethoxysilane, γ-chloropropyltrimethoxysilane, vinyltri(β-methoxy-ethoxy) silane, allyltrimethoxysilane, γ-acryloxypropyltrimethoxysilane, γ-acryloxypropyltriethoxysilane, γ-methacryloxypropyltrimethoxysilane, γ-methacryloxypropyltriethoxysilane, γ-methacryloxypropyldimethoxymethylsilane, γ-mercaptopropytrialkoxysilane, γ-aminopropytrimethoxysilane, γ-aminopropyltriethoxysilane, N-phenyl-γ-aminopropytrimethoxysilane, 3-triethoxysilyl-N-(1,3-dimethyl-butylidene)propylamine, N-2-(aminoethyl)-3-aminopropyltriethoxysilane, N-2-(aminoethyl)-3-aminopropytrimethoxysilane, N-2-(aminoethyl)-3-aminopropymethyldimethoxysilane, p-styryltrimethoxysilane, 3-isocyanatepropyltriethoxysilane, etc. and partly or wholly-hydrolyzed thereof, or partly condensed thereof. Among them, γ-glycidoxypropyltrimethoxysilane, γ-glycidoxypropylmethyldimethoxysilane, tetraethoxysilane, methyltriethoxysilane, γ-acryloxypropyltrimethoxysilane, γ-acryloxypropyltriethoxysilane, γ-methacryloxypropyltrimethoxysilane and partly or wholly-hydrolyzed thereof, or partly condensed thereof may be preferable in order to improve the adhesion to an optical base material and the adhesion to a hard coating layer which is obtained by curing the coating composition comprising inorganic oxide fine particles and a hydrolyzable group-containing organosilicon compound and which is laminated on the primer coating layer or a photochromic coating layer. The above-described organosilicon compound may be used independently or in combination of two or more kinds.

The blending amount of (D)-component may be determined properly depending upon the physical properties required for the objectives or applications of the coating layer finally obtained and may be preferably from 1 to 50 parts by weight, more preferably from 1 to 30 parts by weight to 100 parts by weight of solid content of urethane resin. Since the blending amount of (D)-component satisfies the above-described range, the adhesion and abrasion resistance of an optical article having a hard coating layer can be improved and the adhesion of an optical article having a photochromic coating layer can be more improved. The blending amount of the above-described (D)-component is the amount on the basis of an organosilicon compound which is not hydrolyzed.

While (D)-component may be mixed directly with (A)-component, (B)-component and (C)-component, it is preferable to mix with each of components after completion of hydrolysis. Since (A)-component contains water, (D)-component can be hydrolyzed by mixing (D)-component with (A)-component, (B)-component and (C)-component. It is, however, preferable that hydrolyzed (D)-component is mixed with (A)-component, (B)-component and (C)-component. It is therefore preferable that (D)-component is completely hydrolyzed by an acid aqueous solution to form hydrolyzed (D)-component which is then mixed with (A)-component, (B)-component and (C)-component. In this case, acid aqueous solution is used preferably in such amount that hydrolyzes (D)-component completely; 0.001~1N aqueous solution of hydrochloric acid may be preferably used in equimolar to five (5) times molar amount of hydrolyzable group (alkoxysilyl group) contained in (D)-component. The molar number is that of water.

As described above, hydrolyzed (D)-component may be mixed with (A)-component, (B)-component and (C)-component in state where it contains an acid aqueous solution.

When such an acid aqueous solution is used as described above, the above-described preferable blending amount of water in the primer composition for an optical article of this invention involves the blending amount of such an acid aqueous solution. However, lower alcohol produced when (D)-component is hydrolyzed is not contained in the above-described preferable blending amount of (C)-component.

(E)-Inorganic Oxide Fine Particles

To the primer composition for an optical article of this invention, (E)-inorganic oxide fine particles may be added (hereinafter, (E)-inorganic oxide fine particles are referred to as just "(E)-component" as the case may be). By adding (E)-component, the refractive index of the primer coating layer obtained can be improved and the abrasion resistance of the hard coating layer can be more improved. (E)-component may be used together with the afore-mentioned (D)-component or used independently without addition of (D)-component. Also, when the primer composition for an optical article is used in order to form a primer coating layer for a photochromic coating layer, it is expected that the refractive index of the primer coating layer obtained is improved and the abrasion resistance of the hard coating layer is improved by addition of (E)-component.

Specifically, silica may be used as (E)-component. When (E)-component is added in order to enhance the refractive index, fine particles of inorganic oxide or complex inorganic oxide comprising at least one element selected from the group consisting of Si, Al, Ti, Fe, In, Zr, Au, Sn, Sb, W and Ce may be preferably used; and particularly, fine particles of inorganic oxide or complex inorganic oxide comprising at least one element selected from the group consisting of Si, Al, Ti, Fe, Zr, Sb and W may be more preferably used. As complex inorganic oxide fine particles, those comprising 0~80 weight % of titanium oxide, 1~25 weight % of zirconium oxide, 0~80 weight % of tin oxide, 0~20 weight % of antimony pentoxide, 0~10 weight % of tungsten oxide and 0~25 weight % of silicon dioxide may be preferable.

The particle diameter of (E)-component may be preferably primary particle diameter of around 1~300 nm observed by a transmission electron microscope (TEM). Fine particles having such particle diameter are usually used in state where they are dispersed in water or a part of organic solvent (specifically alcohol family solvent) described later as a dispersing medium; colloidal dispersion is generally used to prevent fine particles from being coagulating. For example, in this invention it is preferable that inorganic oxide fine particles are added in the primer composition for an optical article in the form of sol in which they are dispersed in water soluble organic solvent such as methanol, ethanol, isopropanol, etc. or water from the view point that they are dispersed homogeneously in the primer composition for an optical article.

As described above, as water soluble organic solvent used for a dispersing medium for (E)-component, an alcohol solvent such as methanol, ethanol, isopropanol, etc. may be preferable; however methylethylketone, methylisobutylketone, dimethylacetamide, etc. can be used.

That is to say, in this invention, it is preferable that (E)-component is mixed with other components in the form of sol in which (E)-component is dispersed in water or above-described water-soluble organic solvent, specifically in the form of silica sol, inorganic oxide fine particles sol or complex inorganic oxide fine particles sol. The order of mixing (E)-component with other components is not particularly restricted.

Silica sol may be commercially available; for example, sol comprising water as a dispersing medium is sold from NISSAN CHEMICAL INDUSTRIES, LTD under registered trade mark "Snowtex" "Snowtex OS" "Snowtex O" or "Snowtex O-40". Sol comprising a water-soluble organic solvent as a dispersing medium is sold from NISSAN CHEMICAL INDUSTRIES, LTD under the trade name "methanol silica sol" "MA-ST-MS" (dispersing medium: methanol), "IPA-ST" (dispersing medium: isopropanol), etc.

Sol of complex inorganic oxide fine particles may be also commercially available; for example, "HX series" "HIT series" or "HT series" manufactured by NISSAN CHEMICAL INDUSTRIES, LTD and "OPTLAKE" series manufactured by JGC Catalyst and Chemicals Ltd. (registered trade mark) are exemplified.

In this invention, the blending amount of (E)-component may be appropriately determined according to the physical properties of the primer coating layer finally obtained; however, to 100 parts by weight of solid content of urethane resin, solid content of inorganic oxide fine particles may be preferably from 5 to 150 parts by weight, and more preferably from 10 to 130 parts by weight. Since (E)-component satisfies the above-described blending amount in terms of inorganic oxide fine particles, lowering of the impact resistance and the adhesion of an optical article on which a hard coating layer or photochromic coating layer is formed can be suppressed.

In this invention, when (E)-component is used in state of sol prepared by dispersing (E)-component in water or (C)-component, the above-described blending amounts of water and of (C)-component involves the amount of water contained in the sol and the amount of (C)-component. Naturally, also in the preferable weight ratio of (B)-component to (C)-component (B/C), (C)-component is converted as an amount containing the amount of lower alcohol having 1~4 carbon atoms contained in the sol.

Other Components:

Further, it is preferable that a leveling agent is added in the primer composition for an optical article used in this invention for the purpose of the improvement in the smoothness of the primer coating layer obtained. Known leveling agents may be used without limitation, and preferred examples include silicone series, fluorine series, acryl series, vinyl series, etc. The leveling agent may be added preferably in 10~10000 ppm, more preferably in 50~5000 ppm into the primer composition for an optical article of this invention.

Method for Preparing a Primer Composition for an Optical Article:

The primer composition for an optical article of this invention can be prepared by mixing the above-described (A)-component, (B)-component and (C)-component, and water, (D)-component, (E)-component and other components, if necessary. It is, however, preferable that as (D)-component hydrolyzed (D)-component may be preferably used as aforementioned. The order of mixing each of these components is not specifically restricted, but known methods for mixing may be adopted.

The primer composition for an optical article of this invention can be prepared by mixing the above-described each of components in such a quantitative relationship that satisfies the above-described preferred ranges of amounts, but the solid content of the primer composition for an optical article may be preferably from 3 to 35 weight %. That is to say, when the whole of the primer composition for an optical article is taken as 100 weight %, it is preferable that solid content is from 3 to 35 weight %. The concentration of the solid content of the primer composition for an optical article is equivalent to the concentration of urethane resin when the primer composition for an optical article does not comprise (D)-component and (E)-component, and is equivalent to the concentration including hydrolyzed product of (D)-component when the primer composition for an optical article comprises (D)-component, and is equivalent to the concentration including the solid content of (E)-component when the primer composition for an optical article comprises (E)-component. Since the concentration of the solid content of the primer composition for an optical article satisfies the above-described ranges, the control of the film thickness of the primer coating layer formed is made easy and the improvements in the impact resistance and the adhesion are made easy.

When the primer composition for an optical article is used for the improvement in the adhesion of a plastic lens (optical base material) to a photochromic coating layer (that is, it is used for a first laminated article), the concentration of the solid content of the primer composition for an optical article may be preferably from 15 to 35 weight %. By setting the concentration of the solid content of the primer composition for an optical article within such range, the control of the film thickness of the primer coating layer is made easy and a first laminated article obtained exhibits excellent properties.

The concentration of the solid content of the primer composition for an optical article can be converted from the blending ratio of the primer composition for an optical article and can be obtained by concentrating and drying the primer composition.

Next, an optical base material using the above-described primer composition for an optical article is described:

Optical Base Material: Plastic Lens

In this invention, the primer composition for an optical article of this invention is used for the improvement in the impact resistance of an optical base material, specifically, plastic lens. Illustrative examples of a plastic material (resin) forming a plastic lens include polycarbonate-series resins, (meth)acrylate-series resins, acrylate-series resins, thiourethane-series resins, urethane-series resins and thioepoxy-series resins. These plastic materials may be preferably used for a plastic lens.

Photochromic Optical Base Material

The primer composition for an optical article used in this invention has excellent adhesion, specifically with (meth)acrylate-series resins, particularly, with (meth)acrylate-series resins formed by curing a composition comprising polyfunctional acrylate having three or more (meth)acrylate groups and di (meth)acrylate having alkylene glycol chain having 2~15 repeating units. Since such (meth)acrylate-series resins have a large free space, they become a (meth)acrylate-series resin having excellent photochromic properties (that is, a material for photochromic optical base material) when they contain a photochromic compound. The primer composition for an optical article of this invention can be suitably used for a photochromic optical base material comprising such (meth)acrylate-series resins.

Since (meth)acrylate-series resins formed by curing a composition comprising polyfunctional acrylate having three or more (meth)acrylate groups and di (meth)acrylate having alkylene glycol chain having 2~15 repeating units have a large free space as mentioned above, they can contain a great deal of photochromic compound. Accordingly, the primer composition for an optical article of this invention can be suitably used for an optical base material comprising a photochromic coating layer which is prepared by coating the optical base material with a photochromic curable composition comprising the di (meth)acrylate-containing composition and a photochromic compound. The primer composition for an optical article of this invention can be suitably used for an optical base material obtained by curing a photochromic curable composition (photochromic optical base material) as it is.

In the following descriptions, the afore-mentioned photochromic curable compositions are divided into two groups as described below: The photochromic curable composition used for forming a photochromic coating layer by applying it on the optical base material and curing is taken as a photochromic coating agent (hereinafter, referred as just "coating agent" as the case may be). The photochromic curable composition which is cured as it is to form an optical base material is taken as a casting curable composition.

Illustrative examples of the afore-mentioned polyfunctional acrylate having three or more (meth)acrylate groups include trimethylolpropanetri(meth)acrylate, torimethylolpropanetriacrylate, tetramethylolmethanetri(meth)acrylate, tetramethylolmethanetriacrylate. Illustrative examples of the afore-mentioned di (meth)acrylate having alkylene glycol chain having 2~15 repeating units include polyethyleneglycol dimethacrylate having average molecular weight of 536, polytetramethyleneglycol dimethacrylate having average molecular weight of 736, polypropyleneglycol dimethacrylate having average molecular weight of 536,
polyethyleneglycol diacrylate having average molecular weight of 258,
polyethyleneglycol diacrylate having average molecular weight of 308,
polyethyleneglycol diacrylate having average molecular weight of 522,
polyethyleneglycol methacrylate having average molecular weight of 272,
polyethyleneglycol methacrylate having average molecular weight of 536,
2,2-bis[4-acryloxy (polyethoxy)phenyl]propane,
2,2-bis[4-acryloyloxy (diethoxy)phenyl]propane and
2,2-bis[4-acryloyloxy (polyethoxy)phenyl]propane.

To a composition comprising polyfunctional acrylate having three or more (meth)acrylate groups and di (meth)acrylate having alkylene glycol chain having 2~15 repeating units, another polymerizable monomer may be added; for example (meth)acrylate such as glycidyl methacrylate, urethane acrylate, etc. may be added.

By combining such a polymerizable monomer with a photochromic compound, a photochromic coating agent or a casting curable composition can be obtained.

The photochromic compound is not particularly restricted and known compounds may be used. For example, photochromic compounds described in Japanese Patent Application Publication (Toku-kai-Hei) No. 2-28154,
Japanese Patent Application Publication (Toku-kai-Sho) No. 62-288830,
International Publication WO 94/22850, pamphlet,
International Publication WO 96/14596, pamphlet,
International Publication WO 01/60811, pamphlet, U.S. Pat. No. 4,913,544 and U.S. Pat. No. 5,623,005 may be used. The amount of the photochromic compound may be properly determined according to the application of the photochromic coating agent or casting curable composition.

Next, a photochromic optical base material prepared by using photochromic coating agent or casting curable composition is described:

Preparation of a Photochromic Optical Base Material Using the Casting Curable Composition:

Such a photochromic optical base material can be produced by known methods. To the casting curable composition, additives such as antioxidant, radical capturing agent, ultraviolet rays stabilizer, ultraviolet rays absorbing agent, releasing agent, color protecting agent, antistatic agent, fluorescent dye, dye, pigment, perfume, plasticizer, silane coupling agent, photopolymerization initiator, thermal polymerization initiator, etc. may be added, if necessary.

Preparation of a Photochromic Optical Base Material Using the Photochromic Coating Agent:

Such a photochromic optical base material can be produced by known methods. Additives such as silicon-series or fluorine-series surfactant (leveling agent), antioxidant, radical capturing agent, ultraviolet rays stabilizer, ultraviolet rays absorbing agent, releasing agent, color protecting agent, antistatic agent, fluorescent dye, dye, pigment, perfume, plasticizer, silane coupling agent, photopolymerization initiator, thermal polymerization initiator, etc. may be added to the photochromic coating agent, if necessary.

An optical base material on which is formed a photochromic coating layer may have a primer layer formed by known primer compositions such as, for example, the primer composition comprising moisture-curable polyurethane resin described in Patent Literature 5.

A photochromic coating layer may be formed by applying a photochromic coating agent on an optical base material (plastic lens) on which is formed a primer coating layer to cure. While the method of curing the photochromic coating agent is not particularly restricted, a method may be preferably used for curing by irradiation with light such as ultraviolet rays, etc. using a photopolymerization initiator-added photochromic coating agent.

When the photochromic coating agent is cured by irradiation with light such as ultraviolet rays, etc., known light sources may be used without restriction and time for irradiation with light by using the light sources may be properly determined depending on the specific requirements for a photochromic coating layer such as film thickness, etc.

In this invention, when the photochromic coating agent is applied on the optical base material on which the primer coating layer is formed, no pretreatment is particularly required, but the photochromic coating agent may be applied after the primer coating layer is cured (dried) and then cooled.

A method for applying the photochromic coating agent on the optical base material on which the primer coating layer is formed is not particularly restricted, but includes dip-coating, spin-coating, dip-spin-coating, etc. Among them, spin-coating method may be preferably adopted from the viewpoint of uniform of coating layer.

Next, a method for forming the primer coating layer of the primer composition for an optical article of this invention on the optical base material is described below:

Method for Forming the Primer Coating Layer

In this invention, the primer coating layer may be formed by applying the primer composition for an optical article on the optical base material and curing (drying) the primer composition (an optical article may be produced).

The primer coating layer formed of the primer composition for an optical article does not lower the optical characteristic of the optical base material, specifically those of a plastic lens. Therefore, the plastic lens on which is formed the primer coating layer may be used as an optical article as it is. Further, an optical article (laminate) having excellent impact resistance and abrasion resistance may be prepared by applying the coating composition comprising inorganic oxide fine particles and hydrolyzable group-containing organosilicon compound on the primer coating layer and curing to laminate a hard coating layer.

In this invention, when the primer composition for an optical article is applied to the optical base material, it is preferable to carry out pretreatment with respect to the optical base material for the purpose of improvement in the adhesion. Illustrative examples of the pretreatments include the degreasing treatment by an organic solvent, chemical treatment by basic aqueous solution or acidic aqueous solution, polishing treatment by abrasive, plasma treatment by the use of atmospheric pressure plasma or low pressure plasma, corona discharge treatment, flame treatment or UV-ozone treatment, etc. Among them, the degreasing treatment by an organic solvent, alkali-treatment, plasma treatment, corona discharge treatment or UV-ozone treatment may be preferably used separately, or in combination from the view point of improvement in the adhesion of the optical base material to the primer coating layer.

A method for applying the primer composition for an optical article to the optical base material (plastic lens) is not particularly restricted, but its illustrative example includes dip-coating, spin-coating, dip-spin-coating, etc. Among them, the dip-coating may be preferably adopted from the viewpoint of the productivity and uniform of coating layer.

In this invention, the primer composition for an optical article applied on the optical base material by the above-described methods is dried in order to remove finally a solvent contained in the primer composition for an optical article. In this invention, it is preferable that the primer coating layer may be formed by applying the primer composition for an optical article by the above-described methods, after the completion of application heating the primer coating layer of the primer composition for an optical article to remove a solvent. The heating temperature at this time is not particularly restricted, but may be preferably the range of from the room temperature to 120° C., and more preferably the range of from the room temperature to 110° C. from the view point of the prevention of the deformation or change in color of the optical base material. The heating time is not particularly restricted, but may be preferably usually the range of from one (1) minute to one (1) hour, and specifically preferably 20 minutes and below from the view point of the productivity.

As afore mentioned, the primer composition for an optical article of this invention has uses for the improvements in the impact resistance of the optical article and in the adhesion of the optical base material and the photochromic coating layer. There is a case where the preferred thickness of the primer coating layer formed of the primer composition is different depending on each of its applications. Firstly, a case where the primer coating layer is used for the improvement in the impact resistance is described below:

Primer Coating Layer Used for the Improvement in the Impact Resistance: Optical Article:

In the case of the use for the improvement in the impact resistance, the primer coating layer of the primer composition for an optical article of this invention is usually formed on the optical base material, and then a hard coating layer as detailed below is formed on the primer coating layer.

Figure 2:
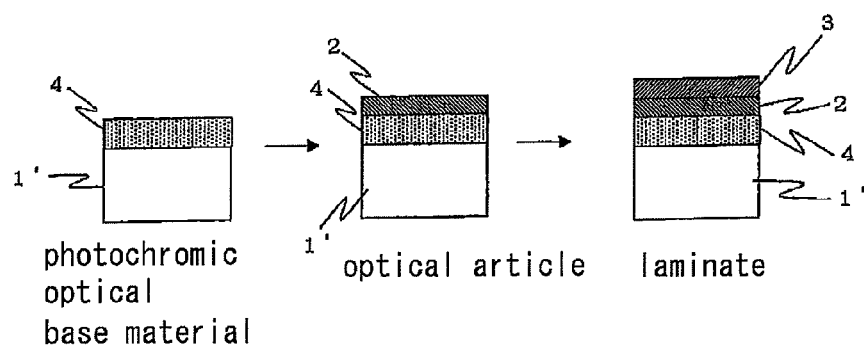
FIG. 2 is a flow diagram of another working embodiment for production of a laminate of this invention.

Flow sheets for the production of the optical articles are shown in FIG. 1 and FIG. 2. Firstly, the primer composition for an optical article of this invention is applied on the optical base material 1 according to the above-described method, and then it is dried to form the primer coating layer 2. When an optical base material 1' on which is formed a photochromic coating layer 4 (photochromic optical base material) is used, the optical article is prepared in such a manner as shown in FIG. 2. In such a case, the primer coating layer 2 may be formed by applying the primer composition for an optical article of this invention on the photochromic coating layer 4 according to the above-described method, and drying.

By doing that described above, an optical article may be prepared. Usually, for these optical articles, the hard coating layer 3 as detailed below is formed on the primer coating layer 2. In such an optical article, the film thickness of the primer coating layer 2 may be preferably from 0.1 to 5.0 μm. Since the film thickness of the primer coating layer satisfies the above-described range, the impact resistance can be enhanced, and simultaneously, the problems of lowering of the abrasion resistance and occurrence of crack can be decreased when the hard coating layer is formed.

Next, the case where the adhesion of the optical base material to the photochromic coating layer is improved is described below:

The Use for the Improvement of the Adhesion of the Optical Base Material to the Photochromic Coating Layer: First Laminated Article The primer composition for an optical article of this invention can enhance the adhesion of the optical base material to the photochromic coating layer.

Figure 3:
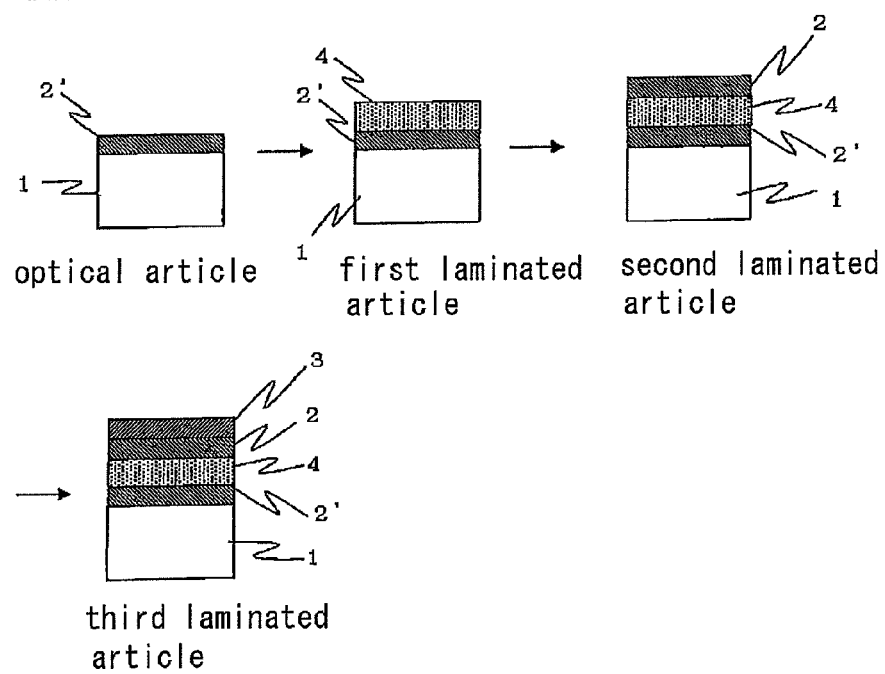
FIG. 3 is a flow diagram of a working embodiment for production of a third laminate of this invention.

A schematic block diagram for the process for production of a first laminated article obtained for this use is shown in FIG. 3. Firstly, the primer composition for an optical article of this invention is applied on the optical base material 1 in such a manner as described above and dried to form the primer coating layer 2' (production of an optical article). Then, the photochromic coating agent which is described in the above-described photochromic optical base material is applied on the primer coating layer 2' to form the photochromic coating layer 4 in similar manner to that for production of the photochromic optical base material (production of a first laminated article).

The thickness of the primer coating layer 2' may be preferably from 0.5 μm to 20.0 μm, more preferably from 1.0 to 15.0 μm. When the photochromic coating layer as detailed below is formed, such a problem as occurrence of crack can be decreased while maintaining the excellent adhesion.

The optical base material 1 used may be a photochromic optical base material, but may be preferable a photochromic optical base material containing no photochromic compound in order to make the control of color tone easy. The thickness of the photochromic coating layer 4 is not particularly restricted, but may be preferable the range of 10~80 μm in order to exhibit excellent effects.

Second Laminated Article

The first laminated article obtained in such a manner as described above may be used as it is. It is, however, preferable to form a primer coating layer for the improvement of the impact resistance when it is used for an eyeglass lens. A flow sheet of the laminated article (second laminated article) of such an embodiment is shown in FIG. 3.

The second laminated article may be prepared by applying the primer composition for an optical article of this invention on the photochromic coating layer 4 of the first laminated article in such a manner as described above, and drying to form a primer coating layer 2. In this case, the thickness of the primer coating layer 2 may be preferably from 0.1~5.0 μm and below in order to improve the impact resistance.

As described above, the optical article and the second laminated article on each of which the primer coating layer is formed respectively may be used for an eyeglass lens, etc. as they are. It is, however, more preferable to form a hard coating layer on the primer coating layer, which is obtained by curing the coating composition comprising inorganic oxide fine particles and a hydrolyzable group-containing organosilicon compound. Next, the hard coating layer is described below:

Coating Composition for Hard Coating Layer:

In this invention, it is possible to laminate on the afore-mentioned primer coating layer a hard coating layer obtained by curing the coating composition comprising inorganic oxide fine particles and a hydrolyzable group-containing organosilicon compound. As the inorganic oxide fine particles used for the hard coating layer, the afore-mentioned silica sol, inorganic oxide or complex inorganic oxide fine particles may be used without restriction.

The blending amount of the inorganic oxide fine particles may be properly determined depending on the types of the inorganic oxide, physical properties or objectives required for the hard coating layer finally obtained. In general, the blending amount of the inorganic oxide fine particles may be preferably set corresponding to the amount of usage of other components so that the ratio of the inorganic oxide fine particles with respect to the hard coating layer finally obtained becomes 20~80 weight %, specifically 40~60 weight %. The weight of the hard coating layer may be obtained by weighing the weight of the solid content remaining after heating the coating composition at a temperature of 120° C. for three hours to remain.

The hydrolyzable group-containing organosilicon compound has a function as a binder for the inorganic oxide fine particles and forms a transparent cured product to be a matrix in the hard coating layer, and a polymerizable organosilicon compound may be used therefore. The organosilicon compound has an alkoxyl group as a functional group, and the afore-mentioned known hydrolyzable group-containing organosilicon compound may be used without limitation. The organosilicon compound may be used alone or in combination of two or more kinds. The organosilicon compound may be used in the form that at least a part thereof is hydrolyzed or in the form of partial condensate formed by condensation of its partial hydrolysate. In this invention, γ-glycidoxypropyltrimethoxysilane, γ-glycidoxypropylmethyldimethoxysilane or tetraethoxysilane or partial hydrolysate or partial condensate thereof may be preferably used from the view point of adhesion with a plastic lens or capability of being crosslinked.

In this invention, in order to prevent the crack of the hard coating layer and the lowering of the storage stability of the coating composition, the hydrolyzable group-containing organosilicon compound may be preferably used in 50 to 500 parts by weight, more preferably in 60 to 400 parts by weight, and specifically preferably in 70 to 300 parts by weight to 100 parts by weight of inorganic oxide fine particles. It may be also preferable that the hydrolyzable group-containing organosilicon compound is used so that the total amount of the hydrolyzable group-containing organosilicon compound and inorganic oxide fine particles exists in the coating composition in 15~50 weight %, preferably 20~40 weight %. The hydrolyzable group-containing organosilicon compound herein described is in such a state that an alkoxyl group contained is not hydrolyzed.

It is considered that in this coating composition, the hydrolyzable group-containing organosilicon compound is hydrolyzed to form a hydrolysate, then the hydrolysate is polymerized and cured (polycondensation) in the form that it uptakes the inorganic oxide fine particles to form a cured product for a matrix, said cured product forming the hard coating layer comprising the matrix in which the inorganic oxide fine particles are dispersed closely. Therefore, water is required for acceleration of the hydrolysis of the hydrolyzable group-containing organosilicon compound in order to form the cured product.

Such water may be used in 20~80 parts by weight, preferably in 20~65 parts by weight, and more preferably in 20~60 parts by weight to 100 parts by weight of total amount of the inorganic oxide fine particles and the hydrolyzable group-containing organosilicon compound. That is to say, when the amount of water is small, the hydrolysis of the alkoxy group contained in the hydrolyzable group-containing organosilicon compound does not progress sufficiently, and therefore the hardness of the hard coating layer obtained and the characteristics of the storage stability of the coating composition, etc. may be possibly lowered. On the other hand, when an excessive amount of water than necessary is used, it is difficult to form the hard coating layer having a uniform thickness, which adversely affects the optical characteristics of the optical base material on which the hard coating layer is formed. The amount of the hydrolyzable group-containing organosilicon compound herein described is that in sate where an alkoxy group contained is not hydrolyzed.

It is not objectionable that the water used for such a purpose as described above is added in the form of acid aqueous solution; and for example, inorganic acid such as hydrochloric acid, sulfuric acid, nitric acid, phosphoric acid, etc. or organic acid such as acetic acid, propionic acid, etc. may be added in the form of aqueous solution thereof. Among them, hydrochloric acid or acetic acid may be preferably used from the view point of the storage stability and hydrolyzability of the coating composition. The concentration of the acid aqueous solution may be preferably 0.001~0.5N, specifically 0.01~0.1N.

As previously mentioned, inorganic oxide fine particles may be possibly used in the form of dispersion (sol) formed by dispersing them in water. Acid may be possibly added in the form of aqueous solution in order to accelerate the hydrolysis of the hydrolyzable group-containing organosilicon compound. In such a case, it is preferable that the amount of water existing in the coating composition including the amount of water contained in the dispersion of inorganic oxide fine particles or acid aqueous solution is adjusted so as to fall in the above-described range. For example, when the amount of water contained in the dispersion of the inorganic oxide fine particles satisfies the above-described range of the amount of water, no additional water is required. On the other hand, when the amount of the water contained in the dispersion of the inorganic oxide fine particles does not satisfy the above-described range of the amount of water, additional water may be preferable.

A curing catalyst for acceleration of hydrolysis of the hydrolyzable group-containing organosilicon compound may be added to the coating composition. As such a curing catalyst, known ones, for example, acetylacetonato complex, perchlorate, organometallic salt, various kinds of Lewis acids may be used. These may be used independently or in combination of two or more kinds.

Illustrative examples of acetylacetonato complex include aluminum acetylacetonato, lithium acetylacetonato, indium acetylacetonato, chromium acetylacetonato, nickel acetylacetonato, titanium acetylacetonato, iron acetylacetonato, zinc acetylacetonato, cobalt acetylacetonato, copper acetylacetonato, zirconium acetylacetonato, etc. Among them, aluminum acetylacetonato or titanium acetylacetonato may be preferable.

Illustrative examples of perchlorate include magnesium perchlorate, aluminum perchlorate, zinc perchlorate, ammonium perchlorate, etc.

Illustrative examples of organometallic salt include sodium acetate, zinc naphthenate, cobalt naphthenate, zinc octylate, etc.

Illustrative examples of Lewis acid include stannic chloride aluminum chloride, ferric chloride, titanium chloride, zinc chloride, antimony chloride, etc.

From the view point that in case of the coating composition, a hard coating layer having high abrasion resistance can be obtained at relatively lower temperatures for a short range of time, an acetylacetonato complex may be specifically preferable and may constitute 50 weight % and above, and specifically 70 weight % and above of a curing catalyst, and it is most suitable that the whole amount of polymerization catalyst is an acetylacetonato complex.

The curing catalyst may be preferably used in 1~15 parts by weight, specifically in 1~10 parts by weight to 100 parts by weight of the afore-mentioned hydrolyzable group-containing organosilicon compound from the view point of obtaining a hard cured film.

An organic solvent may be added to the coating composition. Such an organic solvent is a solvent for the hydrolyzable group-containing organosilicon compound and is a dispersing medium for the inorganic oxide fine particles. Known organic solvents may be used as long as they have such functions and volatility at the same time. Illustrative examples of such organic solvents include alcohols such as methanol, ethanol, propanol, isopropanol, butanol, diacetone alcohol, etc.; lower alcohol esters of lower carboxylic acid such as methyl acetate, ethyl acetate, propyl acetate, etc.; ethers such as cellosolve, dioxane, ethylene glycol monoisopropyl ether, etc.; ketones such as acetone, methyl ethyl ketone, methylisobutyl ketone, acetylacetone, etc.; halogenated hydrocarbons such as methylene chloride, etc.; aromatic hydrocarbons such as benzene, toluene, xylene, etc. These organic solvents may be used independently or in combination of two or more kinds. Among these organic solvents, methanol, isopropanol, t-butyl alcohol, diacetone alcohol, ethylene glycol monoisopropyl ether or acetylacetone may be preferably used from the view points that they have compatibility with water added optionally and that when the coating composition is applied to be cured, they evaporate easily to form a smooth coating layer. As described above, a part of such organic solvents may be mixed previously with the inorganic oxide fine particles as a dispersing medium for the inorganic oxide fine particles.

The amount of use of the organic solvent is not specifically restricted, but the total amount thereof may be preferably 100~2500 parts by weight, specifically 140~150 parts by weight to 100 parts by weight of the afore-mentioned hydrolyzable group-containing organosilicon compound in order to obtain the storage stability and sufficient abrasion resistance. The amount of use of the organic solvent herein described is not an amount in case where the amount of alcohol produced at the time of hydrolysis of the hydrolyzable group-containing organosilicon compound is taken into consideration, but an amount in case where the hydrolyzable group-containing organosilicon compound is not hydrolyzed.

The coating composition for forming the hard coating layer may be produced by mixing the above-described components by means of known methods. Particularly, the hydrolyzable group-containing organosilicon compound may be preferably mixed with other components after the hydrolyzable group-containing organosilicon compound is completely hydrolyzed.

Method of Forming the Hard Coating Layer: Laminate and Method of Third Laminated Article:

In this invention, the hard coating layer of the above-described coating composition may be formed on the above-described optical article and second laminated article on which are formed the primer coating layer, according to known methods (a laminate and a third laminated article can be produced).

Flow sheets in a case where the hard coating layer 3 is formed on the primer coating layer 2 of the optical article are shown in FIG. 1 and FIG. 2 (process for producing a laminate is shown). A flow sheet in a case where the hard coating layer 3 is formed on the primer coating layer 2 of the second laminated article is shown in FIG. 3 (process for producing a third laminated article is shown).

The hard coating layer 3 of this invention may be formed by applying the coating composition to the optical article or a second laminated article on which the primer coating layer 2 is formed, drying to cure. By forming the hard coating layer 3, a product having an excellent impact resistance and abrasion resistance can be produced.

In this invention, when the coating composition is applied on the optical article or a second laminated article on which are formed the primer coating layer 2 is formed, a pretreatment is not specifically required, but the coating composition may be applied after the primer coating layer 2 is cured (dry) and cooled.

A method of applying the coating composition on the primer coating layer 2 is not specifically restricted, but a dip-coating method, spin-coating method, dip-spin-coating method, etc. may be adopted. Among them, a dip-coating method may be preferably adopted from the view point of productivity and uniform of the coating layer.

Since a solvent contained in the coating composition must be removed finally, the coating composition applied on the primer coating layer 2 by the above-described methods is dried. In this invention, it is preferable to form the hard coating layer 3 by heating the coating layer of the coating composition to remove a solvent. The heating temperature at this time is not specifically restricted, but may be preferably in the range of 90~130° C., specifically preferably 90~110° C. from the view points of the adhesion, impact resistance and prevention of deformation or change in color of plastic lens by heating. The heating time is not specifically restricted, but may be preferable the range of one hour to five hours, specifically preferably the range of one hour to three hours from the view point of productivity.

The film thickness of the hard coating layer 3 formed in such a manner as described above may be preferably 1.0~4.0 µm. Since the film thickness of the hard coating layer satisfies the above-described range, a laminate having the excellent impact resistance and abrasion resistance can be obtained.

Since the primer composition for an optical article of this invention has high effect of the improvement in the impact resistance, it may be preferably applied to a laminate on which is formed a hard coating layer having Bayer ratio (method of evaluation is described later) of 5.0 and above, preferably 5.5 and above.

Other Components:

In this invention, to the hard coating layer of a laminate or a third laminated article having the hard coating layer of the coating composition, processings such as vapor deposition of a thin film of an inorganic oxide such as $SiO_2$, $TiO_2$, $ZrO_2$, etc., antireflection treatment by application of a thin film of an organic polymer, antistatic treatment, etc. or secondary treatment may be applied, if necessary.

EXAMPLES

This invention shall be described in more detail with reference to the following examples, but this invention shall not be restricted to these examples.

Each of components and plastic lenses (optical base material) used in examples are described below:
Optical Base Material: Plastic Lens (diameter: 70 mm, thickness: 2.0 mm)
Lens A (allyl resin plastic lens: refractive index=1.50)
Lens B (thiourethane-series resin plastic lens: refractive index=1.60)
Lens C (thiourethane-series resin plastic lens: refractive index=1.67)
Lens D (thioepoxy-series resin plastic lens: refractive index=1.71)
Lens F (methacrylic resin+polyvinyl chloride plastic lens: refractive index=1.60)
Lens H (polycarbonate resin plastic lens: refractive index=1.59)
The above-described commercially available lenses were used.

Photochromic optical base materials described below were also used:
Photochromic Optical Base Material:
Lens E (methacrylic resin plastic lens: refractive index=1.50)
Lens G (plastic lens on the surface of which is formed a coating layer of methacrylic resin (photochromic coating layer)
Method of Preparation of Lens E Firstly, a polymerizable composition was prepared comprising, as raw materials, 43 parts by weight of polypropylene glycol dimethacrylate having an average molecular weight of 328; 10 parts by weight of trimethylolpropane trimethacrylate; 5 parts by weight of methoxypolyethylene glycol methacrylate having an average molecular weight of 394; 16 parts by weight of polyethylene glycol diacrylate having an average molecular weight of 522; 1 part by weight of glycidyl methacrylate; 1 part by weight of α-methyl styrene dimer; and 25 parts by weight of urethane acrylate ("EBECRYL 4858" (registered trade mark, commercially available from DAICEL CHEMICAL INDUSTRIES, LTD.) which were radical polymerizable monomers. Then, to 100 parts by weight of the polymerizable composition thus prepared, 0.1 parts by weight of bis (1,2,2,6,6-pentmethyl-4-piperidyl) sebacate, 10.03 parts by weight of photochromic compound; 1.0 part by weight of t-butylperoxyneodecanate as a radical polymerization initiator; and 0.1 parts by weight of 2,2'-azobis (2,4-dimethylvaleronitril) as a radical polymerization initiator were added and mixed vigorously to prepare a photochromic polymerizable composition. Subsequently, the composition thus prepared was poured into a mold composed of a gasket made up of a glass plate and ethylene-vinyl acetate copolymer to carry out cast polymerization. The polymerization was carried out while rising the temperature gradually from 33° C. to 90° C. for 17 hours and then maintaining the temperature at 90° C. for 2 hours by the use of an air oven. After completion of the polymerization, the mold was taken out of the air oven, and allowed to cool down. After cooling down, a cured product was taken out of the glass of the mold, then put into an oven to heat at a temperature of 110° C. for three hours. A plastic lens thus prepared (photochromic optical base material) has a diameter of 70 mm and thickness of 2.0 mm similar to those of the above-identified lens.

[Formula 1]

photochromic compound 1

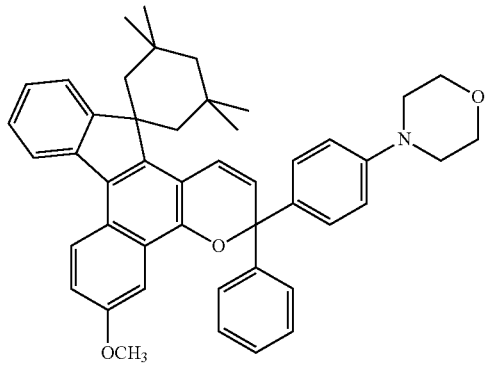

Method of Preparation of Lens G:

Firstly, 2,2-bis(4-acryloyloxypolyethylenglycolphenyl) propane having an average molecular weight of 776/polyethyleneglycol diacrylate (average molecular weight: 532)/trimethylolpropane trimethacrylate/polyester oligomer hexaacrylate/glycidyl methacrylate which were radically polymerizable monomers were mixed in a mixing proportion of 40 parts by weight/15 parts by weight/25 parts by weight/10 parts by weight/10 parts by weight to prepare a mixture of radical polymerizable monomers. Then, to 100 parts by weight of the mixture of radically polymerizable monomers thus prepared, 3 parts by weight of photochromic compound 2 were added, and was subjected to ultrasonic dissolution carried out at a temperature of 70° C. for 30 minutes. After that, to the composition thus obtained, 0.35 parts by weight of a mixture, as a polymerization initiator, of CGI1870:1-hydroxycyclohexylphenylketone and bis (2,6-dimethoxybenzoyl)-2,4,4-trimethyl-pentylphosphinoexide (weight ratio=3:7); 5 parts by weight of bis(1,2,2,6,6-pentmethyl-4-piperidyl) sebacate as a stabilizer; 3 parts by weight of triethyleneglycol-bis[3-(3-t-butyl-5-methyl-4-hydroxyphenyl) propionate]; 7 parts by weight of γ-methacryloyloxypropyltrimethoxysilane as a silane coupling agent; and 0.1 parts by weight of silicone-surfactant as a leveling agent "L-7001" (trade name; manufacture by Dow Corning Toray Co., Ltd.); were added and mixed vigorously to prepare a photochromic curable composition (photochromic coating agent).

[Formula 2]

photochromic compound 2

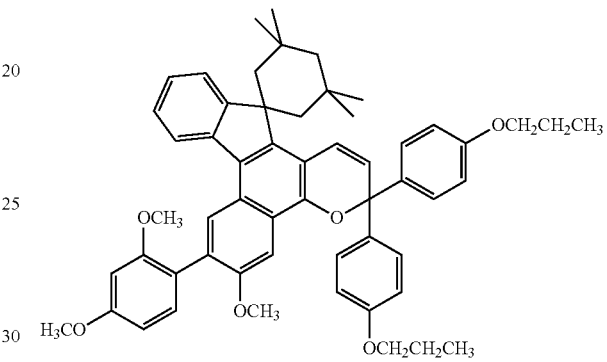

Lens B of the thickness 2.0 mm (thiourethane-series plastic lens; refractive index=1.60) was used as an optical base material. Lens B was degreased sufficiently by acetone, treated by 5% aqueous solution of sodium hydroxide of 50° C. for 4 minutes, rinsed by running water for 4 minutes, rinsed by distilled water of 40° C. for 4 minutes, and then dried at a temperature of 70° C. Then, 50 parts by weight of a moisture-curing type primer "Takeseal PFR402TP-4" (manufactured by Takebayashi Chemical Ind. Co., Ltd.) was mixed with 50 parts by weight of ethyl acetate to prepare a mixed liquid. To the mixed liquid thus prepared 0.03 parts by weight of leveling agent "FZ-2104" (trade name; manufacture by Dow Corning Toray Co., Ltd.) were added and stirred vigorously under nitrogen atmosphere to prepare liquid. The liquid thus obtained was used as primer coating liquid. The primer liquid was spin-coated on the surface of Lens B by means of a spin-coater "1H-DX2" (trade name; manufactured by MIKASA Co., Ltd.). Subsequently, Lens B thus treated was allowed to stand at room temperature for 15 minutes to prepare a plastic lens having a primer coating layer of 7 μm in film thickness.

Thereafter, 1 g of the afore-mentioned photochromic coating agent was spin-coated on the surface of the above-described plastic lens having a primer coating layer. The lens on the surface of which is coated with the coating layer of the photochromic coating agent was irradiated with light for 3 minutes in nitrogen gas atmosphere to cure the coating layer by the use of UV curing apparatus "F3000SQ" (trade name, manufactured by FUSION UV SYSTEMS) equipped with D valve, adjusted so that the output power at 405 nm on the surface of the lens is 150 mW/cm². Thereafter, it was subjected to heat treatment in a thermostat of 110° C. for 1 hour to form Lens G having a photochromic coating layer. The film thickness of the photochromic coating layer to be obtained can be adjusted depending on the conditions of spin coating.

In this invention, the film thickness of the photochromic coating layer was adjusted so as to be 40±1 μm.

A-Component: Aqueous Dispersion of Urethane Resin:

U1: "SUPERFLEX420" (registered trade mark, manufactured by Dai-ichi Kogyou Seiyaku Co. Ltd., average particle diameter: 120 nm, elongation: 280%, Tg: −20° C., 100% modulus: 15N/mm$^2$, solid content (urethane resin) concentration: about 32 weight %, water: about 65 weight %, contains polycarbonate-derived skeleton, crosslinkable).

U2: "SUPERFLEX460" (registered trade mark, manufactured by Dai-ichi Kogyou Seiyaku Co. Ltd., average particle diameter: 100 nm, elongation: 750%, Tg: −25° C., 100% modulus: 2N/mm$^2$, solid content (urethane resin) concentration: about 38 weight %, water: about 62 weight %, contains polycarbonate-derived skeleton, crosslinkable).

U3: "SUPERFLEX470" (registered trade mark, manufactured by Dai-ichi Kogyou Seiyaku Co. Ltd., average particle diameter: 100 nm, elongation: 650%, Tg: −30° C., 100% modulus: 3N/mm$^2$, solid content (urethane resin) concentration: about 38 weight %, water: about 62 weight %, contains polycarbonate-derived skeleton, crosslinkable).

U4: "EVAFANOL HA-50C" (registered trade mark, manufactured by NICA CHEMICAL Co., Ltd., average particle diameter: 80 nm, elongation: 450%, Tg: −30° C., 100% modulus: 7N/mm$^2$, solid content (urethane resin) concentration: about 35 weight %, water: about 62 weight %, contains polycarbonate-derived skeleton, crosslinkable).

U5: "EVAFANOL HA-107C" (registered trade mark, manufactured by NICA CHEMICAL Co., Ltd., average particle diameter: 120 nm, elongation: 900%, Tg: −30° C., 100% modulus: 2N/mm$^2$, solid content (urethane resin) concentration: about 40 weight %, water: about 60 weight %, contains polycarbonate-derived skeleton, crosslinkable).

U6: "HYDRAN WLS-210" (registered trade mark, manufactured by DIC Corporation, average particle diameter: 65 nm, elongation: 500%, Tg: −30° C., 100% modulus: 2N/mm$^2$, solid content (urethane resin) concentration: about 35 weight %, water: about 65 weight %, contains polycarbonate-derived skeleton, uncrosslinkable).

U7: "HYDRAN WLS-213" (registered trade mark, manufactured by DIC Corporation, average particle diameter: 120 nm, elongation: 400%, Tg: −35° C., 100% modulus: 6N/mm$^2$, solid content (urethane resin) concentration: about 35 weight %, water: about 65 weight %, contains polycarbonate-derived skeleton, uncrosslinkable).

U8: "HYDRAN CP-7060" (registered trade mark, manufactured by DIC Corporation, average particle diameter: 95 nm, elongation: 270%, Tg: −25° C., 100% modulus: 8 N/mm$^2$, solid content (urethane resin) concentration: about 21 weight %, water: about 79 weight %, contains polycarbonate-derived skeleton, uncrosslinkable).

Aqueous Dispersion of Urethane Resin Not-Corresponding to A-Component:

U9: "Neorez R-9603" (trade name, commercially available from KUSUMOTO CHEMICALS, Ltd., average particle diameter: 70 nm, elongation: 10%, Tg: −10° C., solid content (urethane resin) concentration: about 33 weight %, water: about 53 weight %, contains polycarbonate-derived skeleton, uncrosslinkable).

U10: "SUPERFLEX150" (registered trade mark, manufactured by Dai-ichi Kogyou Seiyaku Co. Ltd., average particle diameter: 150 nm, elongation: 330%, Tg: 30° C., solid content (urethane resin) concentration: about 30 weight % contains polyester-ether-derived skeleton, crosslinkable).

U11: "SUPERFLEX300" (registered trade mark, manufactured by Dai-ichi Kogyou Seiyaku Co. Ltd., average particle diameter: 150 nm, elongation: 1500%, Tg: −40° C., solid content (urethane resin) concentration: about 30 weight %, contains polyester-ether-derived skeleton, crosslinkable).

U12: "ADEKA BONTIGHTER-HUX320" (trade name, manufactured by ADEKA CORPORATION, average particle diameter: 130 nm, elongation: 250%, Tg: 40° C., solid content (urethane resin): about 33 weight %, contains polyester=ether-derived skeleton).

B-Component: Organic Solvent Having 3~9 Carbon Atoms Having at Least Ether Bond or Carbonyl Bond in a Molecular and One Hydroxyl Group in a Molecule:

EG1: ethylene glycol monoisopropylether (boiling point: 144° C.)

EG2: ethylene glycol mono-n-butylether (boiling point: 170° C.)

EG3: ethylene glycol monomethylether (boiling point: 124° C.)

EG4: ethylene glycol mono-tert-butylether (boiling point: 152° C.)

PG1: propylene glycol monomethylether (boiling point: 120° C.)

PG2: diacetone alcohol (boiling point: 169° C.)

C-Component: Lower Alcohol Having 1~4 Carbon Atoms:

MeOH: methanol (surface tension: 22 dyn/cm$^2$, boiling point: 64.5° C.)

EtOH: ethanol (surface tension: 22 dyn/cm$^2$, boiling point: 78.3° C.)

TBA: t-butanol (surface tension: 20 dyn/cm$^2$, boiling point: 82.5° C.)

SBA: 2-butanol (surface tension: 21 dyn/cm$^2$, boiling point: 99.5° C.)

IPA: isopropyl alcohol (surface tension: 21 dyn/cm$^2$, boiling point: 82.4° C.)

D-Component: Hydrolyzable Group-Containing Organosilicon Compound:

SC1: γ-glycidoxypropyltrimethoxysilane

E-Component: Inorganic Oxide Fine Particles:

SOL1: aqueous dispersion silica gel ("Snowtex O-40"; registered trade mark, manufactured by NISSAN CHEMICAL INDUSTRIES, LTD, solid content concentration (concentration of silica fine particles): 40 weight %)

SOL2: methanol dispersion sol of complex inorganic oxide fine particles comprising zirconium oxide: 11.7 weight %; tin oxide: 77.6 weight %; antimony oxide: 7.0 weight %; and silicon dioxide: 3.7 weight % (solid content concentration (concentration of complex inorganic oxide fine particles): 40 weight %)

SOL3: methanol dispersion sol of complex inorganic oxide fine particles comprising tin oxide: 12.0 weight %; titanium oxide: 61.3 weight %; zirconium oxide: 14.3 weight %; and silicon dioxide: 12.3 weight % (solid content concentration (concentration of complex inorganic oxide fine particles): 30 weight %).

Method of Preparation of Coating Composition for Hard Coating Layer:

Preparation of Hard Coating Composition 1:

104.0 g of γ-glycidoxypropyltrimethoxysilane and 41.0 g of tetraethoxysilane which are as an organic silicon compound, 100.0 g of t-butyl alcohol, 22.5 g of acetylacetone, 75.8 g of methanol and 17.0 g of ethylene glycol monoisopropyl ether which are as an organic solvent, and 0.5 g of silicon surfactant (manufactured by Dow Corning Toray Co., Ltd. "L-7001" (trade name)) were mixed to prepare a solution thereof. While stirring the solution thus prepared vigorously, a mixture of 45.0 g of water and 90.0 g of "Snow Tex O-40" (SOL1) was added to the solution, and after termination of the addition, stirring was continued for 20 hours. Then, 4.2 g of tris (2,4-pentanedionate) aluminum (III) were added to the solution, and stirred for one hour to obtain the Hard Coating Composition 1 of this invention. The Bayer ratio of the Hard Coating Composition 1 was 6.0.

Preparation of Hard Coating Composition 2:

77.9 g of γ-glycidoxypropyltrimethoxysilane and 23.5 g of tetraethoxysilane which are as an organic silicon compound, 30.8 g of t-butyl alcohol, 82.0 g of diacetone alcohol, and 20.0 g of methanol which are as an organic solvent, and 0.3 g of silicon surfactant (manufactured by Dow Corning Toray Co., Ltd. "L-7001" (trade name)) were mixed together to prepare a solution thereof. While stirring the solution vigorously, a mixture of 52.0 g of water and 26 g of 0.05N hydrochloric acid was added to the solution, and after termination of the addition, stirring was continued for 20 hours. Then, 5.0 g of tris (2,4-pentanedionate) aluminum (III) were added to the solution, and stirred for one hour. Thereafter, 182 g of methanol dispersion sol of complex inorganic oxide fine particles comprising zirconium oxide: 11.7 weight %; tin oxide: 77.6 weight %; antimony oxide: 7.0 weight %; and silicon dioxide: 3.7 weight % (solid content concentration (concentration of complex inorganic oxide fine particles: 40 weight %) were added to the solution and stirred for 24 hours to obtain the Hard Coating Composition 2. The Bayer ratio of the Hard Coating Composition 2 was 5.8.

Preparation of Hard Coating Composition 3:

88.3 g of γ-glycidoxypropyltrimethoxysilane as an organosilicon compound, 30.8 g of t-butyl alcohol and 102.0 g of diacetone alcohol which are as an organic solvent, and 0.3 g of silicon surfactant (manufactured by Dow Corning Toray Co., Ltd. "L-7001" (trade name)) were mixed together to prepare a solution thereof. While stirring the solution vigorously, a mixture of 52.0 g of water and 26 g of 0.05 N hydrochloric acid was added to the solution, and after termination of the addition, stirring was continued for 20 hours. Then, 5.0 g of tris (2,4-pentanedionate) aluminum (III) were added to the solution, and stirred for one hour. Thereafter, 234 g of methanol dispersion sol of complex inorganic oxide fine particles comprising tin oxide: 12.0 weight %; titanium oxide: 61.3 weight %; zirconium oxide: 14.3 weight %; and silicon dioxide: 12.3 weight % (solid content concentration (concentration of complex inorganic oxide fine particles): 30 weight %) were added to the solution and stirred for 24 hours to obtain the Hard Coating Composition 3 of this invention. The Bayer ratio of the Hard Coating Composition 3 was 5.0.

Method of Evaluation of Bayer Ratio:

A plastic lens having film thickness of 2.5 μm was obtained by coating the surface of alkali-treated Lens-A (CR39) with the hard coating composition, and curing at 110° C. for 2 hours. Bayer ratio was calculated by evaluating this plastic lens according to the method described below: When testing a plastic lens having a hard coating layer for Bayer abrasion resistance, Bayer testing machine (ASTM D-4060 or ASTN F735-81) can be usually used. In Bayer testing method, a scratch is measured as "haze" of an optical base material having a hard coating layer; therefore, in general, haze is measured by the use of a spectrometer and Bayer ratio is expressed by the use of the formula described below. Generally, when Bayer ratio is four (4) and above, evaluation can be made as "hard" and when Bayer is eight (8) and above, evaluation can be made as "having Bayer abrasion resistance equivalent to a glass."

Bayer ratio=ΔHaze(non-coat)/ΔHaze(hard coat)

In the above-described formula, ΔHaze (non-coat) means that a value obtained by subtracting Haze value of non-coat lens before the testing from Haze value of non-coat lens after the testing. ΔHaze (hard coat) means a value obtained by subtracting Haze value of hard coat lens before the testing from Haze value of hard coat lens after the testing.

A method of testing for measuring Bayer abrasion resistance of the cured product of the hard coating composition of this invention comprises; an abrasive-supporting member in which two holes of φ50 mm are formed, attaching two lenses having a concave surface to the two holes from beneath the holes respectively, said concave surface facing with the holes, putting 500 g of "ABRASIVE" (abrasive of alumina-zirconia) commercially available from SAINT-GOBAIN VERAMIC MATERIALS CANADA INC. as abrasive into the abrasive-supporting member, then rubbing the surfaces of the lenses with the abrasive by vibration of the lenses. A pair of CR non-coat lens as a standard of test and CR-hard coated lens as a test sample was prepared, and the surfaces of such a pair of lenses were ground with the abrasive for two minutes in total with number of vibration of 150 stroke/minutes in a stroke of four inches. Scratches formed on the afore-mentioned lenses were measured by means of Haze meter (trade name) manufactured by Suga Test Instruments Co., Ltd. for Haze value before and after the test for each of a lens without a hard coating layer (non-coat lens) and that with a hard coat (hard coat lens) and Bayer ratio was obtained according to the above-described formula.

EXAMPLES

The following examples are provided only for purposes of illustrating the invention. They are not to be deemed as limiting the invention in any manner.

Example 1

Preparation of Primer Composition-A 100 g of (U1) "SUPERFLEX 420" as an aqueous dispersion of urethane resin (A-Component), 55 g of propylene glycol monomethylether as an organic solvent of B-Component, 80 g of t-butanol as an organic solvent of C-Component, 100 g of water, and 0.2 g of silicon surfactant (manufactured by Dow Corning Toray Co., Ltd. "L-7001" (trade name)) were mixed and stirred at room temperature for one (1) hour to obtain Primer Composition-A of this invention (see: Table-1). Primer Composition-A was stable at 15° C. for six (6) months. This stability of Primer Composition-A is a value evaluated by a method in which the primer composition thus prepared is stored at a temperature of 15° C., and then the physical properties of the primer composition itself and the physical properties of primer coating layer after coating are evaluated on whether or not they are equivalent to initial values thereof. Blending amount is shown in Table-1 and blending proportion which is converted from the blending amount is shown in Table-2.

Formation of Primer Coating Layer and Hard Coating Layer: Production of Laminate:

Lens-A (allyl resin plastic lens; refractive index=1.50) was used as an optical base material. Lens-A was degreased sufficiently by acetone, and rinsed by ultrasonic for five minutes with 20 weight % aqueous solution of sodium hydroxide. Then, Lens-A thus treated was coated with the afore-mentioned Primer Composition-A by dip-coating at the pulling-up speed of 10 cm/min. and dried at a temperature of 80° C. for 10 minutes to form a primer coating layer having the film thickness of 1.5 μm (production of an optical article). Thereafter, Lens-A having the primer coating layer was cooled to room temperature, coated with the afore-mentioned Hard Coating Composition-1 by dip-coating at the pulling-up speed of 15 cm/min. and cured at a temperature of 110° C. for two hours to obtain a plastic lens (laminate) having a primer coating layer 1.5 μm in film thickness and a hard coating layer 2.5 μm in film thickness.

Evaluations were carried out for the plastic lens having the above-described primer coating layer and hard coating layer with respect to each of the evaluation items shown in (1) to (5) described below. As a result, the plastic lens has evaluations in which appearance: ⊚, steel wool abrasion resistance: A (1 kg), B (3 kg), adhesion: 100/100, boiling adhesion (five hours): 100/100, impact resistance: 198 g. Results obtained were summarized in Table-3.

Evaluation Items:

(1) Appearance

Evaluations of the appearance of the plastic lens having the primer coating layer and hard coating layer were carried out according to a method in which the lens having these coating layers was irradiated with light of high-pressure mercury-vapor lamp to throw its projected image onto a white paper; and observation evaluation was carried visually. Evaluation standards are shown below.

⊚: nonuniformity of coating layer is not observed.
○: no special problems, but defect due to lines on the order of 1~2 lines is observed.
Δ: defect due to lines on the order of 4~9 lines is observed.
X: defect due to lines of 10 or above or cissing-like pattern or both is observed; it is fatal defect in appearance.

(2) Steel Wool Abrasion Resistance:

The surface of a plastic lens was rubbed back-and-forth 10 times with steel wool ("BONSTAR #0000", trade name, manufactured by Nihon Steel Wool Co., Ltd.) under a load of 1 kg and 3 kg to visually evaluate degree of scratches. Evaluation criteria are shown below.

A: hardly scratched (a case where scratches less than 5 are visually observed)
B: extremely slightly scratched (a case where scratches from 5 to less than 10 are visually observed)
C: slightly scratched (a case where scratches from 10 to less than 20 are visually observed)
D: clearly scratched (a case where scratches of 20 and above are visually observed)
E: peeling of a hard coating layer occurs.

(3) Adhesion:

The adhesion of a primer coating layer and hard coating layer to a plastic lens was evaluated by a crosscut tape test according to JIS D-0202. That is to say: 100 squares were made by cutting the surface of the hard coating layer at intervals of about 1 mm crosswise. Then, a cellophane self-adhesive tape ("Cellotape" registered trade mark, manufactured by NICHIBAN CO., LTD.) was adhered tightly over the 100 squares; subsequently the cellophane self-adhesive tape was peeled of quickly in a direction at right angles from the surface. After the peeling, the number of squares in which the hard coating layer remained was measured.

(4) Boiling Adhesion Test:

A plastic lens as a test piece was immersed in boiled distilled water every one hour, and then it was taken out of the boiled distilled water. After wiping drops of water off the plastic lens, the plastic lens thus treated was allowed to stand at room temperature for one hour, thereafter, the adhesion was evaluated similarly to the adhesion test method described in above (3). As for a plastic lens maintaining the adhesion, such a test was carried out until the boiling time reaches five hours in total. Number of squares in which the hard coating layer remained was measured was measured similarly to the adhesion test method described in above (3).

(5) Impact Resistance:

Steel balls weighing 16 g, 32 g, 50 g, 80 g, 95 g, 112 g, 138 g, 151 g, 174 g, 198 g and 225 g were dropped from the height of 127 cm to the middle of the plastic lens as a test piece in increasing order of weight to evaluate on whether or not the plastic lens was cracked. The results of evaluation were shown by maximum weight of the steel ball.

Examples 2~22

Preparation of Primer Compositions B~O

Primer Compositions B~O were prepared in the same manner as that of Primer Composition-A, except that aqueous dispersion of urethane resin (A-Component), an organic solvent (B-component and C-component), hydrolyzable group-containing organosilicon compound (D-component), inorganic oxide fine particles (E-component), water and aqueous solution of hydrochloric acid which are shown in Table-1, respectively, were used (see: Table-1 and Table-2). However, as for the hydrolyzable group-containing organosilicon compound (D-component), the hydrolyzable group was hydrolyzed in another container by using aqueous solution of hydrochloric acid shown in Table-1 and used for the preparation of a primer composition. Blending quantities were shown in Table-1 and blending proportions as converted values were show in Table-2.

Production of Laminate and Evaluation:

Plastic lenses (laminates) having a primer coating layer and hard coating layer were produced in such a manner as that of Example 1 to evaluate them, except that primer compositions, hard coating compositions and plastic lenses shown in Table-3 respectively were used. Results of evaluation were shown in Table-3.

Comparative Examples 1~9

Preparation of Primer Compositions P~U

Primer Compositions P~U were prepared in such a manner as that of Primer Composition A, except that aqueous dispersions of urethane resin (A-component) and organic solvents (B-component and C-component) as shown in Table-3 respectively were used (see: Table 1 and Table-2).

Production of Laminate and Evaluation:

Plastic lenses (laminates) having a primer coating layer and hard coating layer were produced in such a manner as that of Example 1, except that primer compositions, hard coating compositions and plastic lenses shown in Table-3 respectively were used to evaluate them. Results of evaluation were shown in Table-3.

TABLE 1

| Primer composition No. | (A) Aqueous dispersion of urethane resin Compound | Blending amount (g) | (B)-Component Compound | Blending amount (g) | (C)-Component Compound | Blending amount (g) | Water Blending amount (g) | 0.05N hydrochloric acid Blending amount (g) | (D)-Component Compound | Blending amount (g) | (E) Dispersion of inorganic oxide fine particles Compound | Blending amount (g) | Stability |
|---|---|---|---|---|---|---|---|---|---|---|---|---|---|
| A | U1 | 100 | PG1 | 55 | TBA | 80 | 160 | — | — | — | — | — | Six months and more |
| B | U1 | 100 | EG1 | 55 | TBA | 80 | 160 | — | — | — | — | — | Six months and more |
| C | U1 | 100 | PG1 | 55 | EtOH | 80 | 160 | — | — | — | — | — | Six months and more |
| D | U2 | 100 | PG1 | 55 | TBA | 80 | 160 | — | — | — | — | — | Six months and more |
| E | U3 | 100 | PG1 | 55 | TBA | 80 | 160 | — | — | — | — | — | Six months and more |
| F | U4 | 100 | PG1 | 55 | TBA | 80 | 160 | — | — | — | — | — | Six months and more |
| G | U1 | 100 | PG1 | 55 | TBA | 80 | 160 | 2.0 | SC1 | 4.5 | — | — | Six months and more |
| H | U1 | 100 | EG3 | 50 | SBA | 80 | 160 | — | — | — | SOL1 | 60 | Six months and more |
| I | U1 | 100 | EG4 | 70 | IPA | 80 | 160 | — | — | — | SOL2 | 70 | Six months and more |
| J | U1 | 100 | DAA | 50 | MeOH | 90 | 160 | — | — | — | SOL3 | 100 | Six months and more |
| K | U1 | 100 | DAA | 50 | TBA | 90 | 160 | 2.0 | SC1 | 4.5 | SOL3 | 100 | Six months and more |
| L | U5 | 100 | EG1 | 90 | EtOH | 60 | 200 | — | — | — | — | — | Six months and more |
| M | U6 | 100 | PG1 | 70 | TBA | 100 | 200 | — | — | — | — | — | Six months and more |
| N | U7 | 100 | PG1 | 70 | TBA | 90 | 200 | — | — | — | — | — | Six months and more |
| O | U8 | 100 | EG2 | 40 | TBA | 90 | 70 | — | — | — | — | — | Six months and more |
| P | U9 | 100 | PG1 | 55 | TBA | 80 | 160 | — | — | — | — | — | Six months and more |
| Q | U10 | 100 | PG1 | 55 | TBA | 80 | 160 | — | — | — | — | — | Two months |
| R | U11 | 100 | PG1 | 55 | TBA | 80 | 160 | — | — | — | — | — | Two months |
| S | U1 | 100 | PG1 | 55 | TBA | 20 | 160 | — | — | — | — | — | Six months and more |
| T | U12 | 100 | PG1 | 55 | TBA | 80 | 160 | — | — | — | — | — | Six months and more |
| U | U1 | 100 | — | — | TBA | 135 | 160 | — | — | — | — | — | Less than one month |

TABLE 2

| Primer composition No. | (A) Aqueous dispersion of urethane resin Compound | (B)-Component Compound | (B)-Component Blending amount (parts by weight) | (C)-Component Compound | (C)-Component Blending amount (parts by weight) | (B)-Component/(C)-Component weight ratio (B/C) |
|---|---|---|---|---|---|---|
| A | U1 | PG1 | 172 | TBA | 250 | 0.69 |
| B | U1 | EG1 | 172 | TBA | 250 | 0.69 |
| C | U1 | PG1 | 172 | EtOH | 250 | 0.69 |
| D | U2 | PG1 | 145 | TBA | 211 | 0.69 |
| E | U3 | PG1 | 145 | TBA | 211 | 0.69 |
| F | U4 | PG1 | 157 | TBA | 229 | 0.69 |
| G | U1 | PG1 | 172 | TBA | 250 | 0.69 |
| H | U1 | EG3 | 156 | SBA | 250 | 0.63 |
| I | U1 | EG4 | 219 | IPA | 381 | 0.88 |
| J | U1 | DAA | 156 | MeOH | 500 | 0.56 |
| K | U1 | DAA | 156 | TBA | 500 | 0.56 |
| L | U5 | EG1 | 225 | EtOH | 150 | 1.50 |
| M | U6 | PG1 | 200 | TBA | 286 | 0.70 |
| N | U7 | PG1 | 200 | TBA | 257 | 0.42 |
| O | U8 | EG2 | 190 | TBA | 429 | 0.44 |
| P | U9 | PG1 | 167 | TBA | 242 | 0.69 |
| Q | U10 | PG1 | 183 | TBA | 267 | 0.69 |
| R | U11 | PG1 | 183 | TBA | 267 | 0.69 |
| S | U1 | PG1 | 172 | TBA | 63 | 2.75 |
| T | U12 | PG1 | 167 | TBA | 242 | 0.69 |
| U | U1 | — | — | TBA | 422 | 0.00 |

| Primer composition No. | (D)-Component Compound | (D)-Component Blending amount (parts by weight) | (E)-Component (ratio of only inorganic oxide fine particles) Compound | (E)-Component Blending amount (parts by weight) | Concentration of solid content (**) (weight %) |
|---|---|---|---|---|---|
| A | — | 0 | — | 0 | 8.1 |
| B | — | 0 | — | 0 | 8.1 |
| C | — | 0 | — | 0 | 8.1 |
| D | — | 0 | — | 0 | 9.6 |
| E | — | 0 | — | 0 | 9.6 |
| F | — | 0 | — | 0 | 8.9 |
| G | SC1 | 10.0 | — | 0 | 8.8 |
| H | — | 0 | SOL1 | 75.0 | 12.4 |
| I | — | 0 | SOL2 | 87.5 | 12.5 |
| J | — | 0 | SOL3 | 93.8 | 12.4 |
| K | SC1 | 10.0 | SOL3 | 93.8 | 12.9 |
| L | — | 0.0 | — | 0.0 | 8.9 |
| M | — | 0.0 | — | 0 | 7.4 |
| N | — | 0.0 | — | 0 | 7.6 |
| O | — | 0.0 | — | 0 | 7.0 |
| P | — | 0 | — | 0 | 8.4 |
| Q | — | 0 | — | 0 | 7.6 |
| R | — | 0 | — | 0 | 7.6 |
| S | — | 0 | — | 0 | 9.6 |
| T | — | 0 | — | 0 | 8.4 |
| U | — | — | — | — | 8.1 |

※ In TABLE 2, the blending amount of each of components is described in values obtained by conversion of the ratio to 100 parts by weight of urethane resin (solid content.)
(**) The concentration of solid content shows the concentration of solid content contained in the entire primer composition for an optical article.

TABLE 3

| | Primer composition No. | Optical base material | Hard coating composition | Appearance | Abrasion resistance 1 kg loading | Abrasion resistance 3 kg loading | Adhesion |
|---|---|---|---|---|---|---|---|
| Example 1 | A | A | 1 | ⊚ | A | B | 100 |
| Example 2 | A | B | 1 | ⊚ | A | B | 100 |
| Example 3 | A | C | 1 | ⊚ | A | B | 100 |
| Example 4 | A | D | 1 | ⊚ | A | B | 100 |
| Example 5 | A | E | 1 | ⊚ | A | C | 100 |
| Example 6 | A | F | 1 | ⊚ | A | B | 100 |
| Example 7 | A | G | 1 | ⊚ | A | C | 100 |

TABLE 3-continued

| | | | | | | | | |
|---|---|---|---|---|---|---|---|---|
| Example 8 | A | H | 1 | ⊚ | A | B | 100 | |
| Example 9 | B | A | 1 | ○ | A | B | 100 | |
| Example 10 | C | A | 1 | ○ | A | B | 100 | |
| Example 11 | D | A | 1 | ⊚ | A | B | 100 | |
| Example 12 | E | A | 1 | ⊚ | A | C | 100 | |
| Example 13 | F | B | 2 | ⊚ | A | A | 100 | |
| Example 14 | G | G | 1 | ⊚ | A | C | 100 | |
| Example 15 | H | H | 1 | ○ | A | B | 100 | |
| Example 16 | I | B | 2 | ○ | A | B | 100 | |
| Example 17 | J | C | 3 | ⊚ | A | B | 100 | |
| Example 18 | K | D | 3 | ⊚ | A | B | 100 | |
| Example 19 | L | C | 1 | Δ | A | A | 100 | |
| Example 20 | M | E | 1 | ⊚ | A | B | 100 | |
| Example 21 | N | B | 1 | ⊚ | A | B | 100 | |
| Example 22 | O | E | 1 | ○ | A | B | 100 | |
| Comparative Example 1 | P | A | 1 | ○ | B | D | 100 | |
| Comparative Example 2 | P | E | 1 | ⊚ | A | B | 0 | |
| Comparative Example 3 | Q | A | 1 | ⊚ | B | D | 100 | |
| Comparative Example 4 | Q | G | 1 | ⊚ | B | E | 0 | |
| Comparative Example 5 | R | A | 1 | ⊚ | C | E | 100 | |
| Comparative Example 6 | S | A | 1 | X | A | B | 100 | |
| Comparative Example 7 | T | A | 1 | ⊚ | A | B | 100 | |
| Comparative Example 8 | U | A | 1 | X | A | B | 100 | |
| Comparative Example 9 | — | A | 1 | ⊚ | A | C | 100 | |

| | Boiling adhesion test | | | | | Impact |
|---|---|---|---|---|---|---|
| | 1 hour | 2 hours | 3 hours | 4 hours | 5 hours | resistance |
| Example 1 | 100 | 100 | 100 | 100 | 100 | 198 g |
| Example 2 | 100 | 100 | 100 | 100 | 100 | 225 g |
| Example 3 | 100 | 100 | 100 | 100 | 100 | 225 g |
| Example 4 | 100 | 100 | 100 | 100 | 100 | 174 g |
| Example 5 | 100 | 100 | 100 | 100 | 100 | 112 g |
| Example 6 | 100 | 100 | 100 | 100 | 100 | 174 g |
| Example 7 | 100 | 100 | 100 | 100 | 100 | 225 g |
| Example 8 | 100 | 100 | 100 | 100 | 100 | 198 g |
| Example 9 | 100 | 100 | 100 | 100 | 100 | 174 g |
| Example 10 | 100 | 100 | 100 | 100 | 100 | 198 g |
| Example 11 | 100 | 100 | 100 | 100 | 100 | 151 g |
| Example 12 | 100 | 100 | 100 | 100 | 100 | 138 g |
| Example 13 | 100 | 100 | 100 | 100 | 100 | 225 g |
| Example 14 | 100 | 100 | 100 | 100 | 100 | 95 g |
| Example 15 | 100 | 100 | 100 | 100 | 100 | 198 g |
| Example 16 | 100 | 100 | 100 | 100 | 100 | 112 g |
| Example 17 | 100 | 100 | 100 | 100 | 100 | 138 g |
| Example 18 | 100 | 100 | 100 | 100 | 100 | 112 g |
| Example 19 | 100 | 100 | 100 | 100 | 100 | 225 g |
| Example 20 | 100 | 100 | 100 | 100 | 100 | 138 g |
| Example 21 | 100 | 100 | 100 | 100 | 100 | 151 g |
| Example 22 | 100 | 100 | 100 | 100 | 100 | 112 g |
| Comparative Example 1 | 100 | 100 | 100 | 100 | 100 | 50 g |
| Comparative Example 2 | — | — | — | — | — | 80 g |
| Comparative Example 3 | 100 | 100 | 100 | 100 | 100 | 50 g |
| Comparative Example 4 | — | — | — | — | — | 50 g |
| Comparative Example 5 | 100 | 100 | 100 | 100 | 100 | 50 g |
| Comparative Example 6 | 100 | 100 | 100 | 100 | 100 | 174 g |
| Comparative Example 7 | 100 | 100 | 100 | 100 | 100 | 50 g |
| Comparative Example 8 | 100 | 100 | 100 | 100 | 100 | 174 g |
| Comparative Example 9 | 100 | 100 | 100 | 100 | 100 | 32 g |

As apparent from the above-described Examples 1~22, when an aqueous dispersion of urethane resin having a polycarbonate-derived skeleton and the elongation of 100~1000% (A-component), an organic solvent having 3~9 carbon atoms and having at least one ether bond or carbonyl bond in a molecule and one hydroxyl group in a molecule (B-component), and lower alcohol having 1~4 carbon atoms (C-component) are used in preferable proportions, the stability of the primer composition can be obtained, and furthermore, after coating, a laminate having excellent appearance adhesion, boiling adhesion, abrasion resistance and impact resistance can be obtained.

On the other hand, when the primer compositions as shown in Comparative Examples 1~9 were used, at least one physical properties in the stability of liquid, appearance, adhesion, boiling adhesion, abrasion resistance and impact resistance were insufficient.

Example 23

Preparation of Primer Composition-V

Primer Composition-V was prepared in the same manner as that of Primer Composition-A, except that aqueous dispersion of urethane resin (A-component) and organic solvents (B-component and C-component) which are shown in Table-4 respectively were used (see: Table-4 and Table-5).

Production of First Laminated Article and Evaluation:

Lens-H (polycarbonate resin plastic lens: refractive index=1.59) was used as an optical base material. This plastic lens was degreased sufficiently with methanol, and subjected to ultrasonic rinsing in distilled water heated to 50° C. for five minutes. Then, the above-described Primer Composition-V was spin-coated on the surface of Lens-H by means of a spin coater "1H-DX2" (trade name, manufactured by MIKASA Co., Ltd.). Lens-H thus treated was allowed to stand at room temperature for 15 minutes to prepare a plastic lens (optical article) having a primer coating layer with film thickness of 7 µm.

Subsequently, about 1 g of the afore-mentioned photochromic coating agent (photochromic coating agent used for preparation of Lens-G) was spin-coated on the surface of the plastic lens (optical article) having the above-described coating layer. The lens the surface of which was coated with the coating film of the afore-mentioned photochromic coating agent was irradiated with light for 3 minutes in nitrogen gas atmosphere by the use of "F3000SQ" (trade name) equipped with D valve manufactured by FUSION UV SYSTEMS, adjusted so that the output power at 405 nm on the surface of the lens is 150 mW/cm² to cure the coating film and thereafter it was subjected to heat treatment in a thermostat of 110° C. for 1 hour to obtain a plastic lens (first laminate) having a photochromic coating layer. The film thickness of the photochromic coating layer to be obtained can be controlled depending on the conditions of spin coating. In this invention, the film thickness of the photochromic coating layer was controlled so as to be 40±1 µm.

For the plastic lens having the above-described primer coating layer and photochromic coating layer, evaluation was made for each of the afore-mentioned evaluation items (1) (3) and (4). As a result, the plastic lens had the following physical properties: appearance: ⊚, adhesion: 100/100, and boiling adhesion (five hours): 100/100. Results obtained were shown in Table-6.

Examples 24~26

Preparation of Primer Compositions W, X, Y

Primer Compositions-W, X and Y were prepared in the same manner as that of Primer Composition-A, except that aqueous dispersion of urethane resin (A-component) and organic solvents (B-component and C-component) which are shown in Table-4 respectively were used (see: Table-4 and Table-5).

Production of First Laminated Article and Evaluation:

Plastic lenses (first laminated articles) having a primer coating layer were prepared in the same manner as that of Example 23, except that the primer compositions and plastic lenses which are shown in Table-5 respectively were used, and evaluation thereof was made. Results obtained were shown in Table-6.

TABLE 4

| Primer composition No. | (A) Aqueous dispersion of urethane resin | | (B)-Component | | (C)-Component | | Water |
|---|---|---|---|---|---|---|---|
| | Compound | Blending amount (g) | Compound | Blending amount (g) | Compound | Blending amount (g) | Blending amount (g) |
| V | U1 | 100 | DAA | 20 | TBA | 25 | — |
| W | U4 | 100 | DAA | 20 | TBA | 25 | — |
| X | U5 | 100 | EG4 | 15 | IPA | 20 | — |
| Y | U7 | 100 | EG1 | 15 | IPA | 20 | — |

| Primer composition No. | 0.05N hydrochloric acid Blending amount (g) | (D)-Component | | (E) Dispersion of inorganic oxide fine particles | | Stability |
|---|---|---|---|---|---|---|
| | | Compound | Blending amount (g) | Compound | Blending amount (g) | |
| V | — | — | — | — | — | Six months and more |
| W | — | — | — | — | — | Six months and more |
| X | — | — | — | — | — | Six months and more |
| Y | — | — | — | — | — | Six months and more |

TABLE 5

| Primer composition No. | (A) Aqueous dispersion of urethane resin Compound | (B)-Component | | (C)-Component | | (B)-Component/(C)-Component weight ratio (B/C) |
|---|---|---|---|---|---|---|
| | | Compound | Blending amount (parts by weight) | Compound | Blending amount (parts by weight) | |
| V | U1 | DAA | 63 | TBA | 78 | 0.81 |
| W | U4 | DAA | 57 | TBA | 71 | 0.80 |

TABLE 5-continued

| | | | | | | |
|---|---|---|---|---|---|---|
| X | U5 | EG4 | 38 | IPA | 50 | 0.76 |
| Y | U7 | EG1 | 43 | IPA | 57 | 0.75 |

| Primer composition No. | (D)-Component Compound | (D)-Component Blending amount (parts by weight) | (E) Component (ratio of only inorganic oxide fine particles) Compound | (E) Component (ratio of only inorganic oxide fine particles) Blending amount (parts by weight) | Concentration of solid content (**) (weight %) |
|---|---|---|---|---|---|
| V | — | — | — | — | 22.1 |
| W | — | — | — | — | 24.1 |
| X | — | — | — | — | 29.6 |
| Y | — | — | — | — | 25.9 |

※ In TABLE 5, the blending amount of each of components is described in values obtained by conversion of the ratio to 100 parts by weight of urethane resin (solid content.)
(**) The concentration of solid content shows the concentration of solid content contained in the entire primer composition for an optical article.

Examples 27~30

Plastic lenses (second laminated articles) having a primer coating layer and plastic lenses (third laminated articles) having a hard coating layer on the primer coating layer were prepared in the same manner as that of Example 1, except that primer compositions and hard coating compositions which are shown in Table-6 were used on the plastic lenses (first laminated articles) obtained in Examples 23~26 and evaluations thereof were made. Results obtained were shown in Table-6.

primer coating composition of this invention and a photochromic coating layer is laminated on the first primer coating layer to prepare a lens having the first primer coating layer and the photochromic coating layer in that order, and further a second primer coating layer is formed on the photochromic coating layer and a hard coating layer is formed on the second primer coating layer to prepare a lens having the first primer coating layer, the photochromic coating layer, the second primer coating layer and the hard coating layer in that order,

TABLE 6

| | Primer composition No. | Optical base material | Hard coating composition | Appearance | Abrasion resistance 1 kg loading | Abrasion resistance 3 kg loading | Adhesion |
|---|---|---|---|---|---|---|---|
| Example 23 | V | H | — | ⊙ | — | — | 100 |
| Example 24 | W | H | — | ⊙ | — | — | 100 |
| Example 25 | X | H | — | ⊙ | — | — | 100 |
| Example 26 | Y | H | — | ⊙ | — | — | 100 |
| Example 27 | A | Lens prepared by Example 23 | 1 | ⊙ | A | B | 100 |
| Example 28 | A | Lens prepared by Example 24 | 1 | ⊙ | A | B | 100 |
| Example 29 | A | Lens prepared by Example 25 | 1 | ⊙ | A | B | 100 |
| Example 30 | A | Lens prepared by Example 26 | 1 | ⊙ | A | B | 100 |

| | Boiling adhesion test 1 hour | 2 hours | 3 hours | 4 hours | 5 hours | Impact resistance |
|---|---|---|---|---|---|---|
| Example 23 | 100 | 100 | 100 | 100 | 100 | 225 g |
| Example 24 | 100 | 100 | 100 | 100 | 100 | 225 g |
| Example 25 | 100 | 100 | 100 | 100 | 100 | 225 g |
| Example 26 | 100 | 100 | 100 | 100 | 100 | 225 g |
| Example 27 | 100 | 100 | 100 | 100 | 100 | 225 g |
| Example 28 | 100 | 100 | 100 | 100 | 100 | 225 g |
| Example 29 | 100 | 100 | 100 | 100 | 100 | 225 g |
| Example 30 | 100 | 100 | 100 | 100 | 100 | 225 g |

As apparent from Examples 23~26, when a primer coating layer is formed by the use of the primer coating composition of this invention and a photochromic coating layer is laminated on the primer coating layer, a plastic lens having excellent appearance, adhesion and boiling adhesion can be obtained.

Further, as apparent from Examples 27~30, in a case where a first primer coating layer is formed on a lens by using a a plastic lens having excellent appearance, adhesion, boiling adhesion, abrasion resistance, impact resistance and impact resistance can be obtained.

What is claimed is:

1. A primer composition for an optical article, said primer composition comprising;

(A) an aqueous dispersion of urethane resin, said urethane resin having a polycarbonate-derived skeleton and an elongation from 200~1000%, wherein the urethane resin is dispersed in water;

(B) an organic solvent having 3~9 carbon atoms and having an ether bond or a carbonyl bond per molecule of said solvent and one hydroxyl group per said molecule; and (C) a lower alcohol having 1~4 carbon atoms, wherein a weight ratio of said (B) organic solvent to said (C) lower alcohol (B/C) is in the range of 0.01 to less than 2.00.

2. The primer composition for an optical article as claimed in claim 1 comprising; 10~600 parts by weight of (B) organic solvent and 10~800 parts by weight of (C) lower alcohol to 100 parts by weight of solid content of (A) urethane resin.

3. The primer composition for an optical article as claimed in claim 1 further comprising (D) a hydrolyzable group-containing organosilicon compound.

4. The primer composition for an optical article as claimed in claim 3, wherein the amount of said (D) hydrolyzable group-containing organosilicon compound is 1~50 parts by weight to 100 parts by weight of solid content of (A) urethane resin.

5. The primer composition for an optical article as claimed in claim 1 further comprising (E) inorganic oxide fine particles.

6. The primer composition for an optical article as claimed in claim 5, wherein the amount of said (E)-inorganic oxide fine particles is 5~150 parts by weight to 100 parts by weight of solid content of (A) urethane resin.

7. The primer composition for an optical article as claimed in claim 1 further comprising additional water and wherein the total amount of water in the primer composition for an optical article-is from 100 to 1500 parts by weight to 100 parts by weight of solid content of (A) urethane resin.

8. The primer composition for an optical article as claimed in claim 1, wherein the amount of solid content is from 3 to 35 weight % with respect to 100 weight % of the primer composition for an optical article as a whole.

9. An optical article having a primer coating layer obtained by curing the primer composition for an optical article as claimed in claim 1 on an optical base material.

10. An optical article as claimed in claim 9, wherein said optical base material is a photochromic optical base material.

11. An optical article as claimed in claim 10, wherein said photochromic optical base material comprises on the optical base material a photochromic coating layer obtained by curing a photochromic coating agent comprising a photochromic compound, and comprises on said photochromic coating layer a primer coating layer obtained by curing a primer composition comprising (A) an aqueous dispersion of urethane resin, said urethane resin having a polycarbonate-derived skeleton and an elongation from 200~1000%, dispersed in water;

(B) an organic solvent having 3~9 carbon atoms and having an ether bond or carbonyl bond per molecule and one hydroxyl group per molecule; and (C) a lower alcohol having 1~4 carbon atoms, wherein a weight ratio of said (B) organic solvent to said (C) lower alcohol (B/C) is in the range of 0.01 to less than 2.00.

12. A laminate comprising, on the primer coating layer of the optical article as claimed in claim 9, a hard coating layer obtained by curing a coating composition comprising inorganic oxide fine particles and a hydrolyzable group-containing organosilicon compound.

13. A first laminated article comprising, on the primer coating layer of the optical article as claimed in claim 9, a photochromic coating layer obtained by curing a photochromic coating agent comprising a photochromic compound.

14. A second laminated article comprising, on the photochromic coating layer of the first laminated article as claimed in claim 13 a primer coating layer obtained by curing a primer composition for an optical article comprising (A) an aqueous dispersion of urethane resin, said urethane resin having a polycarbonate-derived skeleton and an elongation from 200~1000%, dispersed in water;

(B) an organic solvent having 3~9 carbon atoms and having an ether bond or carbonyl bond per molecule and one hydroxyl group per molecule; and (C) a lower alcohol having 1~4 carbon atoms, wherein a weight ratio of said (B) organic solvent to said (C) lower alcohol (B/C) is in the range of 0.01 to less than 2.00.

15. A third laminated article comprising, on the primer coating layer of the second laminated article as claimed in claim 14, a hard coating layer obtained by curing a coating composition comprising inorganic oxide fine particles and a hydrolyzable group-containing organosilicon compound.

16. The primer composition for an optical article as claimed in claim 1, further comprising (D) a hydrolyzable group-containing organosilicon compound and (E) inorganic oxide fine particles.

17. The primer composition for an optical article as claimed in claim 16, wherein the amount of said (D) hydrolyzable group-containing organosilicon compound is 1~50 parts by weight per 100 parts by weight of solid content of said (A) urethane resin and the amount of said (E) inorganic oxide fine particles is 5~150 parts by weight per 100 parts by weight of solid content of said (A) urethane resin.

* * * * *